US012518166B2

(12) United States Patent
Xu et al.

(10) Patent No.: US 12,518,166 B2
(45) Date of Patent: Jan. 6, 2026

(54) NEURAL NETWORK COMPRESSION

(71) Applicant: Movidius Ltd., Schiphol-Rijk (NL)

(72) Inventors: Xiaofan Xu, Dublin (IE); Mi Sun Park, San Jose, CA (US); Cormac M. Brick, San Francisco, CA (US)

(73) Assignee: Movidius Ltd. (NL)

( * ) Notice: Subject to any disclaimer, the term of this patent is extended or adjusted under 35 U.S.C. 154(b) by 898 days.

(21) Appl. No.: 17/416,461

(22) PCT Filed: Dec. 17, 2019

(86) PCT No.: PCT/US2019/066991
§ 371 (c)(1),
(2) Date: Jun. 18, 2021

(87) PCT Pub. No.: WO2020/131968
PCT Pub. Date: Jun. 25, 2020

(65) Prior Publication Data
US 2022/0067527 A1    Mar. 3, 2022

Related U.S. Application Data

(60) Provisional application No. 62/781,299, filed on Dec. 18, 2018.

(51) Int. Cl.
*G06N 3/082* (2023.01)
*G06N 3/047* (2023.01)
*H03M 7/30* (2006.01)

(52) U.S. Cl.
CPC ............ *G06N 3/082* (2013.01); *G06N 3/047* (2023.01); *H03M 7/702* (2013.01)

(58) Field of Classification Search
CPC ............................... G06N 3/082; G06N 3/047
See application file for complete search history.

(56) References Cited

U.S. PATENT DOCUMENTS

2016/0086078 A1    3/2016  Ji et al.
2016/0321540 A1   11/2016  Towal
2018/0307982 A1   10/2018  Faivishevsky et al.

FOREIGN PATENT DOCUMENTS

WO    2018058509 A1    4/2018
WO    2018214913 A1   11/2018

OTHER PUBLICATIONS

Boo et al. (Boo, Yoonho, and Wonyong Sung. "Structured sparse ternary weight coding of deep neural networks for efficient hardware implementations." 2017 IEEE international workshop on signal processing systems (SIPS). IEEE, 2017.) (Year: 2017).*

(Continued)

*Primary Examiner* — Schyler S Sanks
(74) *Attorney, Agent, or Firm* — Akona IP PC

(57) ABSTRACT

A neural network model is trained, where the training includes multiple training iterations. Weights of a particular layer of the neural network are pruned during a forward pass of a particular one of the training iterations. During the same forward pass of the particular training iteration, values of weights of the particular layer are quantized to determine a quantized-sparsified subset of weights for the particular layer. A compressed version of the neural network model is generated from the training based at least in part on the quantized-sparsified subset of weights.

23 Claims, 13 Drawing Sheets

(56) References Cited

OTHER PUBLICATIONS

Zhou, Shuchang, et al. ("Dorefa-net: Training low bitwidth convolutional neural networks with low bitwidth gradients." arXiv preprint arXiv:1606.06160 (2016).) (Year: 2016).*

Xu et al. (Xu, Xiaofan, Mi Sun Park, and Cormac Brick. "Hybrid pruning: Thinner sparse networks for fast inference on edge devices." arXiv preprint arXiv: 1811.00482 (2018).) (Year: 2018).*

De Castro et al. (de Castro, L. Nunes, and Fernando J. Von Zuben. "An improving pruning technique with restart for the Kohonen self-organizing feature map." IJCNN'99. International Joint Conference on Neural Networks. Proceedings (Cat. No. 99CH36339). vol. 3. IEEE, 1999.) (Year: 1999).*

Y. Choukroun et al. (Y. Choukroun, E. Kravchik, F. Yang and P. Kisilev, "Low-bit Quantization of Neural Networks for Efficient Inference," 2019 IEEE/CVF International Conference on Computer Vision Workshop (ICCVW), Seoul, Korea (South), 2019, pp. 3009-3018, doi: 10.1109/ICCVW.2019.00363.) (Year: 2019).*

Yang et al. (Yang, Haichuan, Yuhao Zhu, and Ji Liu. "End-to-end learning of energy-constrained deep neural networks." arXiv e-prints (2018).) (Year: 2018).*

PCT International Preliminary Report on Patentability issued in PCT/US2019/066991; dated Jul. 1, 2021; 13 pages.

Boo, Yoonho et al., "Structured Sparse Ternary Weight Coding of Deep Neural Networks for Efficient Hardware Implementations," Department of Electrical Engineering and Computer Science, Seoul National University (Jul. 1, 2017) (6 pages).

EPO Extended Search Report and Written Opinion in EP Application Serial No. 19900776.6 mailed on Aug. 25, 2022 (12 pages).

Han, Song, "Efficient Methods and Hardware for Deep Learning," Stanford University, Creative Commons Attribution Noncommercial 3.0(Sep. 2017) (125 pages).

Tung, Frederick et al., "CLIP-Q: Deep Network Compression Learning by In-Parallel Pruning-Quantization," 2018 IEEE/CVF Conference on Vision and Pattern Recognition (2018) (10 pages).

PCT International Search Report and Written Opinion issued in PCT/US2019/066991, dated Apr. 16, 2020; 14 pages.

Li et al., Optimization based Layer-wise Magnitude-based Pruning for DNN Compression, Proceedings of the Twenty-Seventh International Joint Conference on Artificial Intelligence (IJCAI-18), Jul. 1, 2018, 7 pages.

\* cited by examiner

NEURAL NETWORK COMPRESSION

RELATED APPLICATIONS

This application is a national stage application under 35 U.S.C. § 371 of PCT International Application Serial No. PCT/US2019/066991, filed on Dec. 17, 2019 and entitled NEURAL NETWORK COMPRESSION, which application claims the benefit to U.S. Provisional Patent Application Serial No. 62/781,299 filed on Dec. 18, 2018. The disclosures of the prior applications are considered part of and are hereby incorporated by reference in their entirety in the disclosure of this application.

TECHNICAL FIELD

This disclosure relates in general to the field of computer systems and, more particularly, to compressing neural network models for resource constrained computing systems.

BACKGROUND

The worlds of computer vision and graphics are rapidly converging with the emergence of Augmented Reality (AR), Virtual Reality (VR) and Mixed-Reality (MR) products such as those from MagicLeap™, Microsoft™ HoloLens™, Oculus™ Rift™, and other VR systems such as those from Valve™ and HTC™. The incumbent approach in such systems is to use a separate graphics processing unit (GPU) and computer vision subsystem, which run in parallel. These parallel systems can be assembled from a pre-existing GPU in parallel with a computer vision pipeline implemented in software running on an array of processors and/or programmable hardware accelerators. Such hardware may utilize machine learning models, such as convolutional neural networks (CNNs) in connection with machine learning and artificial intelligence operations performed in connection with computer vision applications.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

DETAILED DESCRIPTION OF EXAMPLE EMBODIMENTS

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments provided below are exemplary, and that it is contemplated that there are other systems and methods that are within the scope of the disclosed subject matter.

Figure 1:
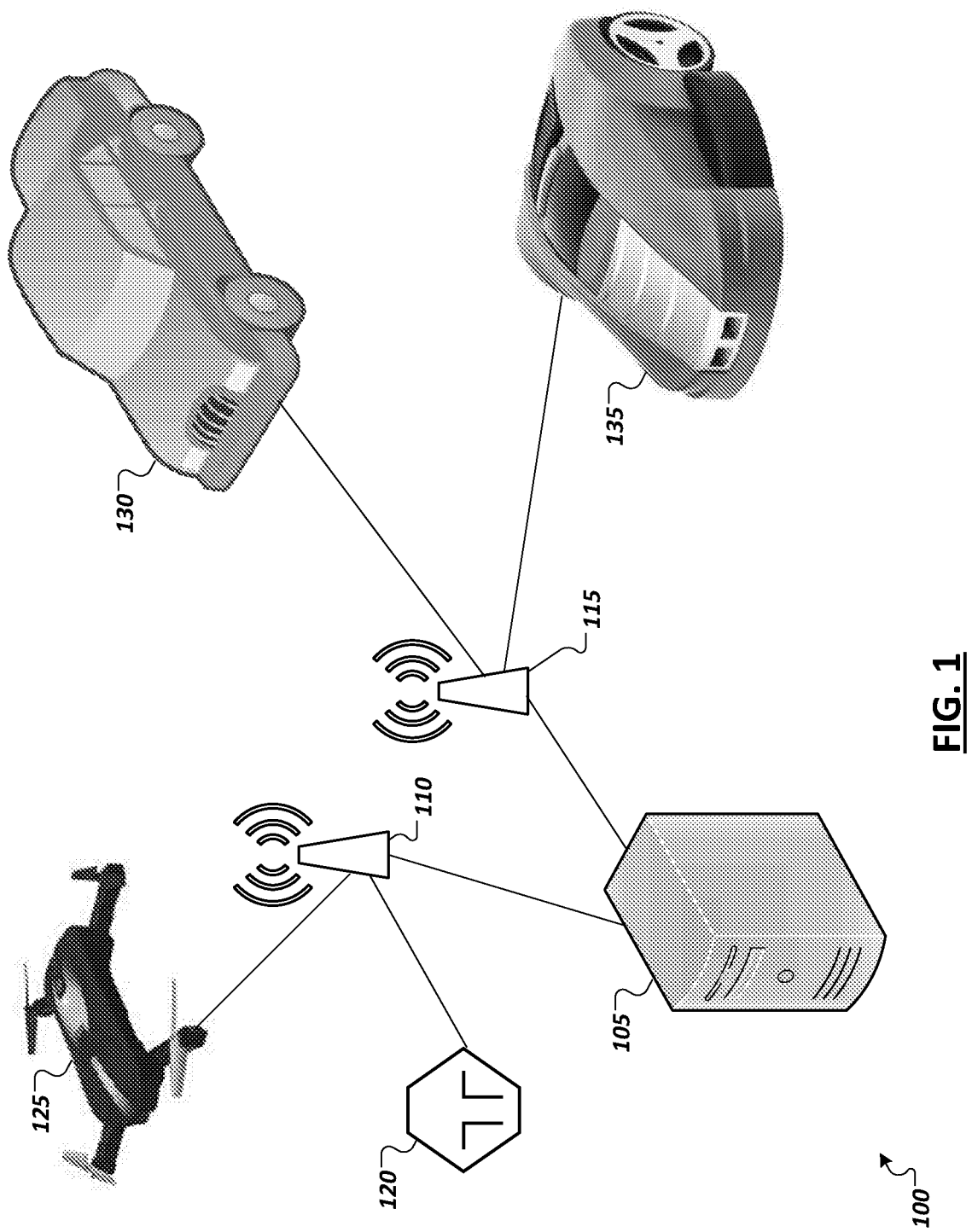
FIG. 1 illustrates an example system including resource-constrained computing devices and a host computing system.

FIG. 1 is a simplified block diagram 100 illustrating a system that includes various devices (e.g., 120, 125, 130, 135) capable of utilizing machine learning models in the course of their operation. For instance, devices may utilize neural network models in connection with detecting persons, animals, or objects within their respective environments and/or conditions, characteristics, and events within these environments based on sensor data generated at the devices 120, 125, 130, 135 and/or received from outside sources (e.g., other devices). For instance, devices may include vehicles (e.g., 130), drones (e.g., 125), robots (e.g., 135), and other devices, which possess autonomous navigation capabilities, allowing the devices to detect attributes and conditions within physical space, plan paths within the environment, avoid collisions, and interact with things within the environment utilizing one or more sensors or a suite of different sensors. The data generated from these sensors may be provided as an input to a machine learning model, such as a neural network model (e.g., convolutional neural network (CNN), deep neural network (DNN), spiking neural network (SNN), etc.), from which one or more inferences or other outputs may be generated that cause actuators of the device (e.g., 125, 130, 135) to autonomously direct movement of the device within the environment. Neural network models and machine learning may be utilized in potentially limitless applications including many outside of autonomous navigation. As an example, internet of things (IoT) devices, security devices, monitors, agricultural sensor device, and other devices (e.g., 120) may also be equipped with one or multiple sensors and the data generated by these sensors may be provided for processing using a neural network model, enabling the device (e.g., 120) to generate events, alarms, or other data which may be presented to a user or provided to other (e.g., backend) computing systems for further processing, aggregation, and/or analysis.

In some implementations, neural network models may be developed by a variety of different developers and entities. The neural network models may be developed and trained on corresponding computing systems using a variety of different training data, depending on the intended use of the model. These models may then be deployed on and used by various devices (e.g., 120, 125, 130, 135) to enable the machine learning and artificial intelligence capabilities of the devices. In some implementation, neural network models may be hosted on host server systems (e.g., 105) and accessed by manufacturers, owners, or users of various devices (e.g., 120, 125, 130, 135) to implement the neural network models on the devices. In some instances, server systems (e.g., 105) may be equipped with pre-processing logic to augment, compress, or otherwise prepare neural network models for consumption by various other systems (e.g., 120, 125, 130, 135). In some implementations, wireless network connections (e.g., facilitated by network access points and gateway devices (e.g., 115, 120)) may be utilized to transfer neural network models onto devices (e.g., 120, 125, 130, 135). In other cases, a portable memory drive or physical connection to a local host system may be utilized to transfer neural network models onto the devices that are to use these models, among other examples.

As machine learning and artificial intelligence increase in prominence, both in academic research and commercial applications, a variety of neural network models have been and are being developed. Coupled with the increasing size of large-scale datasets and high-end graphics, matrix, and tensor processing devices (e.g., GPUs, TPUs, machine learning accelerators, etc.), the size and complexity of deep learning neural networks are also increasing. Although many such modern network models (e.g., such as Visual Geometry Group (VGG) neural network, GoogleNet, DenseNet, ResNets, and others) show outstanding classification performance on large data sets (e.g., ImageNet), they typically occupy large memory footprints and demand significant compute resources. Accordingly, some neural network models, despite their utility, are not easily deployable on resource-constrained inference devices, such as devices with small form factors, battery-powered devices, devices with modest memory and processing capabilities, devices with modest communication capabilities, etc. In short, it may be impractical or impossible to use or deploy modern, sophisticated neural network models in some applications dependent on resource-constrained devices due to these models' large demands for memory, compute resources, and power.

In recent years, deep neural networks have achieved state-of-the-art accuracies in a wide range of computer vision, speech recognition, and machine translation tasks, particularly when using similarly state-of-the-art multiprocessor systems. However, some applications of machine learning and artificial intelligence (AI) may involve devices and systems, where memory and computational resources are limited. Indeed, such resource-constrained systems may not possess the resources to utilize high performance deep neural networks. Indeed. the limits of memory bandwidth and computational power constrain the range of devices capable of deploying these modern networks. Modern, high-performing deep neural networks may consist of tens or hundreds of layers and have millions of parameters requiring billions of float point operations (FLOPs) to execute. Despite the popularity and superior performance, such networks place high demands of memory and computational power limiting the deployment of such networks on resource-constrained edge devices for real-time AI applications like intelligent cameras, drones, autonomous driving, augmented and virtual reality (AR/VR) in retail, and smart healthcare, among other applications and use cases. Network compression and acceleration techniques have been developed to address these limitations including network pruning, network quantization, low-rank approximation, efficient architecture design, neural architecture search, and hardware accelerator solutions.

Various compression techniques may be employed to assist in reducing the size and complexity of neural network models. For instance, network pruning may be utilized to assist in deploy neural network models on embedded systems with limited hardware resources. Network pruning may reduce network size by pruning redundant connections or channels from pre-trained models, and fine-tuning the pruned model to recover accuracy. During network pruning, while many of the related approaches differ in the method of determining the importance of weights or channels of the subject neural network model may be determined, with weights or channels determined to be of lesser importance pruned, or removed, from the model. Fine-grained weight pruning (or "sparsification") may be utilized to remove individual connections, while coarse-grained pruning is utilized to prune entire rows/columns, channels or even filters of the neural network model. Various algorithms and conditions may be utilized to determine importance of network elements and, thereby serve as the basis for pruning. For instance, energy consumption, sparsity, and other characteristics may be utilized to determine the relative importance of a neural network element.

Network quantization is another popular compression technique, which is utilized to reduce the number of bits required to represent each weight (or activation value) in a network. Post-training quantization and training with quantization are two examples of network quantization. For instance, post-training quantization may be used to quantize weights to 8-bit or higher precision from a pre-trained full-precision network with and without fine-tuning. Training with quantization for low-precision networks may be used to train CNNs that have low-precision weights and activations using low-precision parameter gradients. In some cases, compression techniques may be combined to enhance the degree of compression applied to the neural network model. For instance, some solutions attempt to apply both weight sparsification and weight quantization one after the other (serially, in multiple, separate trainings or training iterations) to allow pruning and 8-bit weight quantization to work together to achieve higher compression, among other examples. From a mathematical perspective, to achieve an 8× compression rate, a neural network model is to be quantized with 4-bit precision or sparsified it with at least an 87.5% sparsity level to have an equal rate regardless of the storage overhead of non-zero elements indices. From this, low-precision (e.g., 4-bit or lower) quantization can easily drive higher compression rate than sparsification. However, 2-bit or lower precision quantization tends to result in significant accuracy degradation. For example, the state-of-the-art accuracy for a compressed ResNet50 network is 72.2% (a 4.7% drop), when quantizing both weights and activations with 2-bit precision. Although a high (e.g., 16×) compression rate may be attractive, the degraded accuracy may not be acceptable for real-world applications.

An example joint optimization technique for sparsity and quantization (through single-iteration sparsification-quantization) may be implemented using a computing system to achieve maximal compression while keeping the accuracy close to the original model. For instance, such an approach may realize 17× compression for ResNet50 where both weights and activations are quantized to 4-bit precision and 41% sparsity within 1% drop in accuracy. Similar results may be realized for a broad range of networks, for instance, achieving near-state-of-the-art accuracies using 4-bit and 2-bit precision for ResNet18, ResNet50 and MobileNetv2, with even high degrees of sparsity, among other examples. Particularly for resource-constrained edge devices, where both high compression rate and high accuracy are important, such a system can enable wider deployment of high-performing deep neural networks on such devices.

In an improved system, neural network models may be compressed by the system by unifying the performance of network pruning and network quantization by the system to perform both compression processes in a single training pass and jointly optimize for both sparse and low-precision while achieving high accuracy and high compression rate. While some traditional systems perform both neural network pruning and quantization serially, one after the other, to achieve higher compression, serially performing pruning and quantization not only requires two-stage training, but also makes it difficult to quantize with lower precision after pruning, due to the lack of understanding the impact of pruning weights on quantization, and vice versa. An improved approach which unifies pruning and quantization, such as discussed herein, may implement a more efficient network training process with both sparse low-precision weights and sparse low-precision activations. For instance, an improved system may implement improved neural network training, which enables simultaneous learning for sparse and low-precision neural networks that sparsify and quantize both weights and activations with low precision at each iteration of training. This technique may significantly reduce model size and computational cost while maintaining high accuracy, therefore allowing fast inference on resource-constrained edge devices. In some instances, dramatic compression of a neural network may be achieved through such techniques while making only modest sacrifices to accuracy (e.g., 1-2% loss in overall accuracy). Further, such an approach may enable fast single pass training, which is important for rapid prototyping and neural architecture search techniques, among other example advantages.

Figure 2:
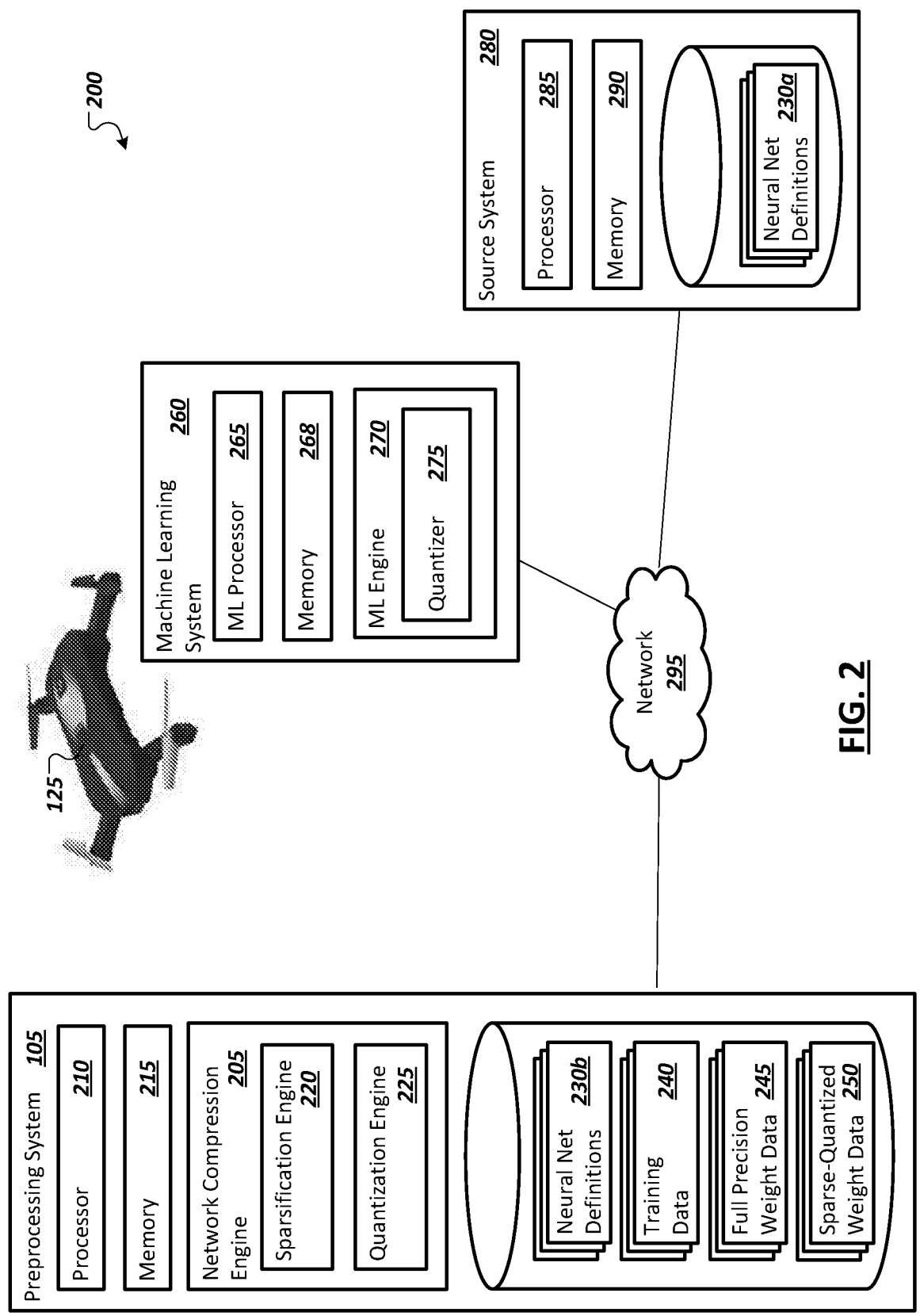
FIG. 2 illustrates an example system including a preprocessing system for preparing compressed versions of neural network models.

Turning to FIG. 2, a simplified block diagram 200 is shown illustrating an example system including a system 105 for use in performing preprocessing on existing neural network models (e.g., 230a-b) to adapt and prepare the models for distribution to and use by resource-constrained devices (e.g., 125) and other computing systems, where it is desired to utilize lean, or sparse, versions of a neural network model. In one example, a pre-processing system 105 may implement a network compression engine 205, implemented in hardware- and/or software-based logic on the preprocessing system 105. The preprocessing system 105 may include one or more data processing devices 210 (e.g., a central processing units (CPUs), graphics processing unit (GPUs), tensor processing units (TPUs), vision processing units (VPUs)) and corresponding hardware accelerators (e.g., machine learning accelerators, matrix arithmetic accelerators, etc.) co-functioning with the processors 210. For instance, network compression engine 205 may be utilized to perform machine learning training steps (e.g., convolutions, loss functions, back propagation, etc.), which may utilize specialized processing hardware, such as processing units adapted to perform matrix arithmetic among other examples (including the example hardware architectures discussed later herein). The preprocessing system 105 may further include one or more computer memory elements 215 to store software code (e.g., to implement all or a portion of the network compression engine 205 and other tools of the preprocessing system) as well as data (e.g., 230b, 240, 245, 250, etc.) used in operation of the preprocessing system 105 generally, including the network compression engine 205 specifically.

In one example implementation, a network compression engine 205 may support and provide functionality to prune and otherwise compress neural network models (e.g., 230a-b). For instance, a unified sparsification-quantization process may be performed by the network compression engine 205, such that both sparsification of the network and quantization are performed on layers of the network during the same training pass (or iteration). In some implementations, a network compression engine 205 may be equipped with logic executable to train deep neural networks to jointly optimize for both sparse and low-precision neural networks while maintaining high accuracy and providing a high compression rate. For instance, such a system may perform sparsification and low-bit quantization into a single training pass, employing these techniques in an order demonstrated to be optimal. For instance, an example network compression engine 205 may include weight sparsification logic implemented by sparsification engine 220 and quantization logic (to quantize weights, gradients, and/or activation values) implemented using an example quantization engine 225. Accordingly, the benefits and functionality enabled through a "dense" modern neural network, adapted for systems and applications where more robust memory, computer, and communication resources are available, may be extended to resource-constrained systems by reducing the size and computational complexity of the neural network without detrimentally sacrificing accuracy.

Neural network models (e.g., 230a-230b) may be developed on and hosted by a variety of different systems (e.g., 105, 280). The preprocessing system 105 may access one or more of these neural network models from remote computing systems (e.g., source system 245) over one or more networks (e.g., 295). In some instances, a preprocessing system 105 may provide the functionality of the network compression engine 205 as a service (through networks 295) to various client systems (e.g., a resource constrained system 125). In such implementations, a query or request may be submitted to the preprocessing system 105 identifying a particular neural network model and requesting that the model be compressed (e.g., through unified (or "single-iteration") sparsification-quantization. In some cases, a copy of the neural network model may be included in the request.

In some implementations, a sparsification engine 225 may prune weights (or channels) of an example network pruner tool 205. For instance, the sparsification engine 225 may apply one or more criteria to identify the relative importance of various channels of a neural network and prune the model to remove those portions of the neural network determined to be less important. Importance, in this sense, may reflect the neural network's sensitivity to the removal of these portions affecting the pruned neural network's accuracy. Sparsification is performed during training of the neural network model (e.g., 230a-b). Training data (e.g., 240) may be used to train the neural network model. Sparsification, in some implementations, may be performed during the forward pass of a training iteration. During the same training iteration (e.g., the forward and backward pass of training iteration) quantization of weights, gradients, and activations may be performed. In some implementations, weight sparsification may be performed in the training iteration before performance of the weight quantization. In other implementations, weight quantization is to occur prior to weight sparsification (in the forward pass of the training iteration). In the backward pass of the training iteration, gradient values (determined from a corresponding loss function) may be similarly quantized.

In some implementations, during training, the full-precision weights of a neural network (e.g., 230b) may be preserved (e.g., in full-precision weight data 245) along with the new compressed sparse-quantized weight data 250 that is determined through the compression performed (during training) by network compression engine 205. In some implementations, during back-propagation, the loss function may be based on the sparse-quantized weights (and resulting activation values derived by convolving the sparse-quantized weights with the activation values of the preceding neural network layer), while the full-precision weights (maintained in full-precision weight data 245) are the values that are updated during back-propagation (using the gradient values determined from the loss function). Following completion of the training iteration, the next training iteration may be performed, with the next iteration of sparsification-quantization being performed on the updated full-precision weights. The sparse-quantized weight data 250 may capture at least the most recently determined sparse-quantized weight values. Upon concluding training (after the final training iteration), the sparse-quantized weight values determined from this final training iteration (and stored in sparse-quantized weight data 250) may be adopted to generate the compressed version of the neural network model for consumption by various machine learning systems, such as resource-constrained systems (e.g., 260).

The preprocessing system 105, upon generated a compressed version of a neural network model, may provide or share the compressed version of the neural network with a number of other systems over one or more communications networks (e.g., 295). For instance, the compressed neural network model may be shared with one or more consumer systems (e.g., 260) configured to utilize the neural network model to perform inferences or other machine learning tasks. Additionally, a compressed version of the neural network model may be shared with one or more host or source systems (e.g., 280), which may act as repositories for neural network models (e.g., which consumer systems may then access and use.

In some implementations, consumer systems may include machine learning systems (e.g., 260) integrated or otherwise provided in association with other machines, which are made "intelligent" by virtue of the computing logic provided by the machine learning system 260 or other computer-implemented logic. Such machines (e.g., 125) may include vehicles, robots, drones, industrial machines, farming equipment, and so on. Machine learning systems (e.g., 260) may also be implemented in connection with Internet of Things (IoT), Fog, Cloud, Big Data, or other computing systems, which advantageously make use of deep learning, among other example systems.

In one example, a machine learning system 260 may include one or more processor devices (e.g., 265) adapted for performing computations and functions to implement machine learning models and inferences. For instance, machine learning processors (e.g., 268) may include graphics processing units (GPUs), vision processing units (VPUs), tensor processing units (TPUs), field programmable gate array (FPGA) devices, deep learning accelerator hardware, and other examples. Machine learning system 260 may additional include one or more memory elements (e.g., 268). A machine learning engine 270 may be thereby implemented to perform and direct machine learning processes. In some implementations, a compressed version of a neural network model may be consumed using the machine learning system 260. A compressed neural network model, such as a model compressed through joint sparsification and quantization, may be sparse in that the (sparsified) weights have been quantized to a small low-bit value. In order to maximize the efficiency provided through such compressed models, in some instances, a machine learning engine (e.g., 270) may include quantizer logic (e.g., 275), which enables the machine learning engine to quantize activations generated (e.g., at each layer) through execution of the compressed neural network (e.g., during inference time). Otherwise, higher-bit (e.g., floating point) activation values may be generated during use of the trained, compressed neural network, resulting in higher computation bandwidth than would be used if the activation values are quantized, thereby preserving the low-bit fidelity of the compressed neural network, among other example features to enhance use of compressed neural network models.

While the illustrated example of FIG. 2 may imply a preprocessing system (e.g., 105), machine learning system (e.g., 260) and source system (e.g., 280) implemented on separate physical systems and hardware, in some implementations, functionality of these systems, as described herein, may be combined and implemented on a single system or multiple distributed systems, among other example implementations. Indeed, a system may include both a network compression engine 205 (e.g., capable of performing single-iteration sparsification-quantization) as well as a machine learning engine (e.g., 270) capable of using neural network models compressed using the network compression engine's functionality, among other example implementations.

In general, "servers," "clients," "computing devices," "network elements," "hosts," "devices," "platforms", and "systems", etc. described in connection with the examples herein, include electronic computing devices operable to receive, transmit, process, store, or manage data and information associated with the computing environment. As used in this document, the term "computer," "processor," "processor device," "processing apparatus," or "processing device" is intended to encompass any suitable processing apparatus. For example, elements shown as single devices within the computing environment may be implemented using a plurality of computing devices and processors, such as server pools, distributed systems, cloud- and/or fog-based systems, and other systems including multiple computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

In some implementations, all or a portion of a computing platform may function as an Internet of Things (IoT) device or system. A collection of devices, or endpoints, may participate in IoT networking, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like.

While FIGS. 1-2 are described as containing or being associated with a plurality of elements, not all elements illustrated may be utilized in each alternative implementation of the present disclosure. Additionally, one or more of the elements described in connection with the examples of FIGS. 1 and 2 may be located external to the illustrated computing environments, while in other instances, certain elements may be included within or as a portion of one or more of the other described elements, as well as other elements not described in the illustrated implementation. Further, certain elements illustrated in these examples may be combined with other components, as well as used for alternative or additional purposes in addition to those purposes described herein.

Figure 3:
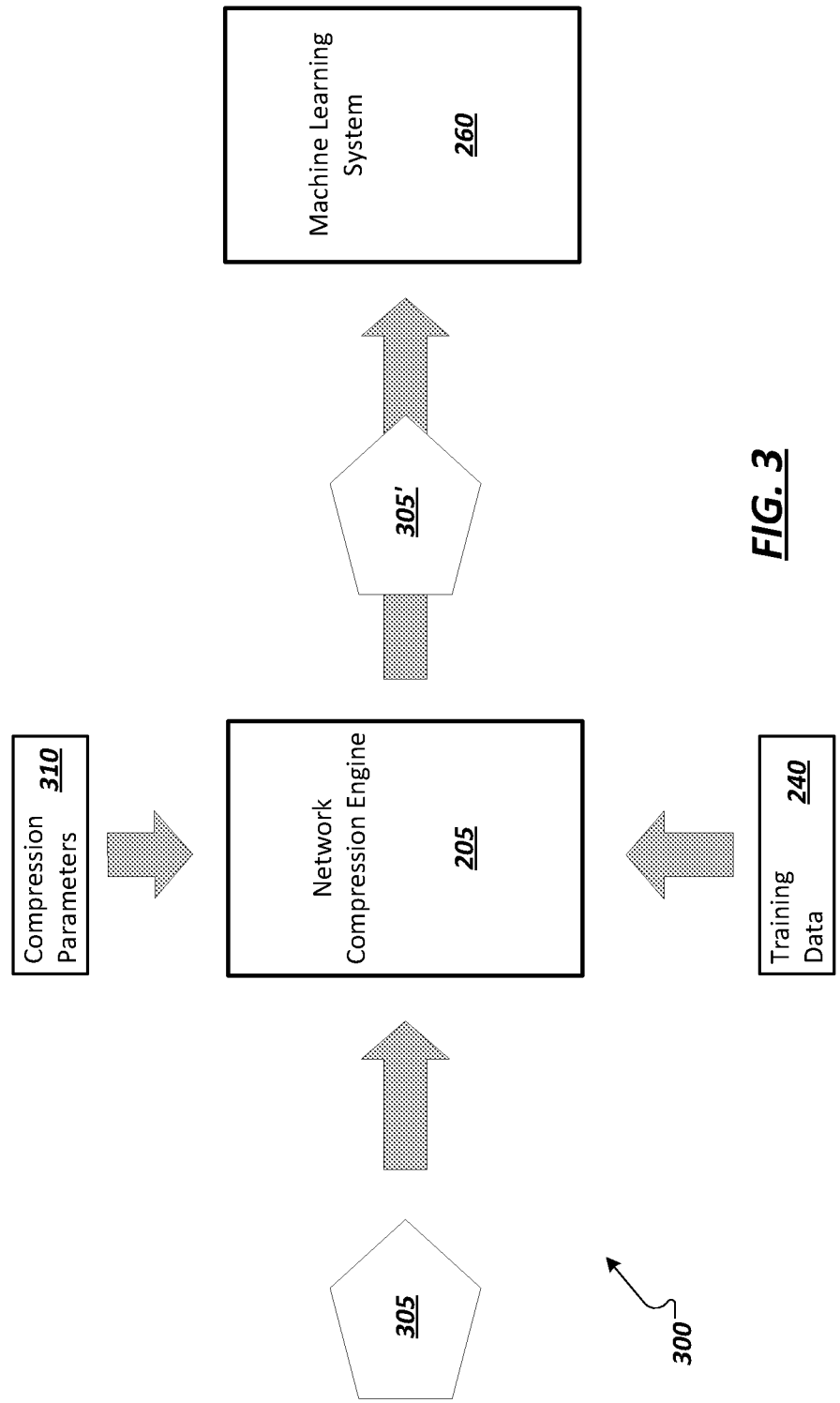
FIG. 3 illustrates compression of an example neural network model.

Turning to FIG. 3, a simplified block diagram 300 is shown illustrating the example compression of an example neural network model 305. The neural network model 305 (or simply "neural network") may be originally developed for use by consuming systems with robust computing resources, making the size and computational complexity of the neural network of small concern. A neural network 305 may include a number of layers, including an input layer, output layer, and a number of different hidden layers interconnected between the input and output layers, among other components. Each layer may include a number of nodes, neurons, or kernels, and the neurons may be interconnected in a variety of ways between the layers. The hidden layers may include one or more different types of layers such as dense layers, convolutional layers, pooling layers, and recurrent layers, among other examples. To enable the use of the neural network 305 by a machine learning system 260 on more resource constrained devices or to minimize computational and memory overhead generally (e.g., even on less constrained systems), the full precision neural network 305 may be provided to a network compression engine 205, executed by a host computing system. The network compression engine 205 may be configured to train the neural network 305 (e.g., using training data 240, such a proprietary or open source training data set) and, during training, apply sparsification and quantization to compress the neural network 305 and generate a compressed, or reduced, version 305' of the neural network, which is substantially compressed with only marginal decrease in accuracy. In one example, performing sparsification followed by 4-bit quantization results in a compressed model, which is not only more efficient in terms of resource utilized, but that also realizes comparable or even better accuracy than the baseline model (e.g., because single-iteration sparsification-quantization acts as an additional regularization which helps prevent overfitting).

The network compression engine may perform both sparsification and quantization in each training iteration within the training of the model 305. In some implementations, a set of parameters (e.g., 310) may be defined and provided as inputs to the network compression engine 205 to specify operation of the network compression engine 205. For instance, such parameters 310 may include the specific sparsification algorithm to apply during sparsification and the specific quantization algorithm to apply, as well as a sparsity parameter (to identify the degree of sparsity to be achieved during sparsification steps), a quantization level (e.g., 2-bit, 4-bit, or another quantization level), a delay value to indicate when in the training compression should begin (e.g., how many training iterations into the training the first sparsification-quantization operations are to be performed), among other example parameters. Accordingly, a network compression engine 205 may generate a variety of different compressed versions (e.g., 305') of the same source neural network (e.g., 305), based on the particular combination of parameters input to the network compression engine 205, among other example features.

Figure 4:
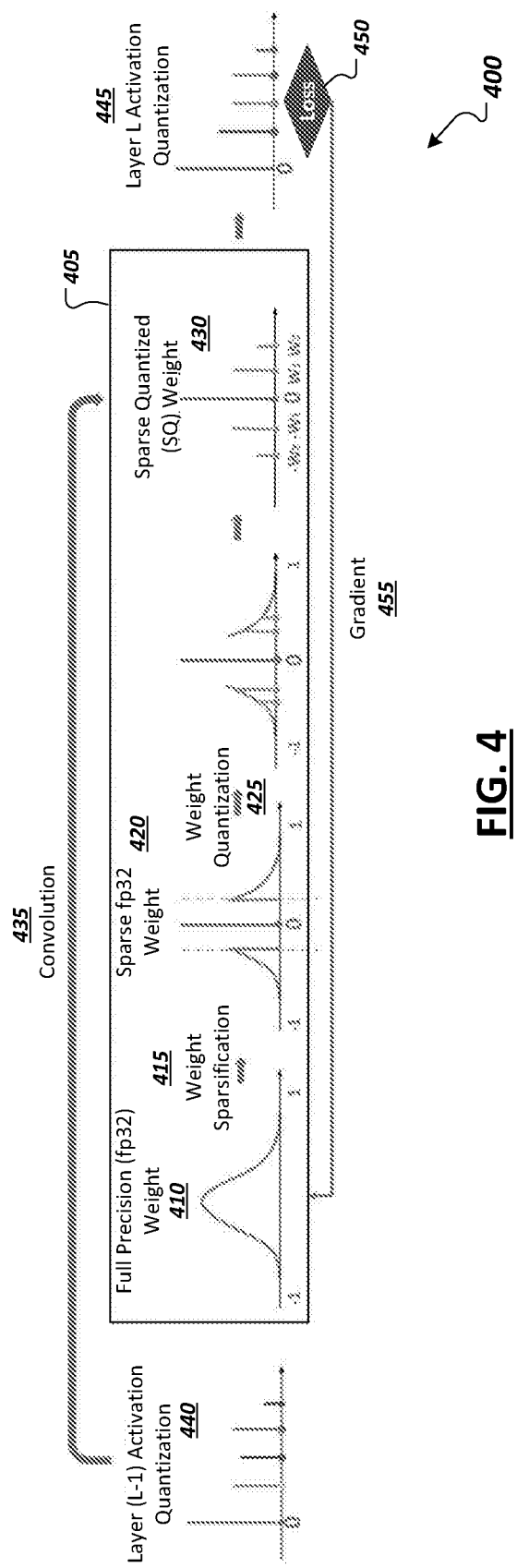
FIG. 4 illustrates an example compression including sparsification and quantization of layers of an example neural network model.

Turning to FIG. 4, a simplified diagram 400 is shown illustrating an example sparsification-quantization 405 performed for a particular layer in an example neural network within a single training iteration (involving that particular layer). A set of full-precision weights 410 (e.g., floating point 32 (fp32)) may be defined for the particular layer. In one example, during the forward pass of the training iteration for the particular layer, weight sparsification 415 may be initially performed (before quantization) to generate a sparsified set of full-precision weights 420 for the layer. Weight quantization 425 may then be applied, within the same forward pass of the same training iteration, to the sparsified weights 420 to generate a set of compressed, sparse-quantized (SQ) weights 430 for the particular layer. Following the sparsification-quantization performed for this particular training iteration, the sparse quantized weights 430 may be convolved 435 with the activation values 440 (e.g., vector or matrix) from the layer (L−1) in the neural network preceding, or feeding into, the particular layer (L). The activation values 440 of layer (L−1) may, themselves, be generated based on compression of weights in layer L−1 using a similar sparsification-quantization compression during the forward pass of the training iteration for the layer L−1. Indeed, each layer of the neural network may be likewise compressed (e.g., as in 405) during a corresponding forward pass within the particular training iteration.

Continuing with the example of FIG. 4, based on the activation function(s) defined for the particular layer, a set of activation values for the particular layer (L) may be generated from the convolution 435. The resulting activation values may also be quantized (to the same level as during weight quantization 425) to generate quantized activation values 445 for the particular layer. During backpropagation within the same training iteration, a loss function 450 may be applied to the quantized activation values 445 to generate gradient values 455. In some implementations, quantization may be applied to these gradient values to make these values consistent with the precision level of other quantized values generated (during 405). During the training iteration, the full precision weights of the particular layer (L) may be maintained and the gradient applied to the full precision weights (e.g., 410) to update these full-precision weight values. These updated weights may then be used in a subsequent training iteration.

Further, after training is completed, the full-precision weights (which have been maintained in memory along with the condensed version(s) of the network determined during training) may be discarded, with only the sparse and low-bit quantized weights kept in the resulting, condensed version of the neural network, which is provided, following training, for deployment on resource-constrained computing devices (e.g., edge devices). In some implementations, use of the condensed neural network model may involve on-the-fly activation quantization (by the system using the neural network) on output activations (at "inference time"), as these values are dynamic and dependent on the inputs (e.g., input images), unlike the network weights, which may be quantized during training time.

In one example, such as shown in FIG. 4, in each forward pass of training, the full-precision weights of a subject network are sparsified based on a layer-wise threshold that is computed from the statistics of the full-precision weights in each layer. The non-zero elements of the sparsified weights may then be quantized, for instance with a min-max uniform quantization function (e.g., the minimum and maximum values of the non-zero weights) or another example quantization approach. In the case of the network's activations, prior sparsification is not necessary, since output activations are already sparse due to the non-linearity of the applied activation function (e.g., rectified linear unit (ReLU) activation). For instance, a ReLU activation function can result in about 50% sparsity. Therefore, in some implementations, only the output activations are quantized after batch normalization and non-linearity, which is also the input activations (e.g., 440) to the following convolutional layer.

In the backward pass (back-propagation within the training pass or iteration), the full-precision dense version of the network may be updated with the gradients 455 of the sparse and low-bit quantized weights and activations. In one example, the gradients calculation for the non-differential quantization function may be approximated, for instance, with the straight-through estimator (STE) technique. In some implementations, the system may dynamically assign sparsification and determine quantization values by leveraging the statistics of the full-precision dense weights in each iteration of training.

As discussed herein, potentially any sparsification technique may be applied in a single-iteration sparsification-quantization process by a computing system, such as discussed herein. In one example implementation, statistic-aware sparsification may be utilized to prune connections in each layer by removing (zeroing out) the connections with absolute weight values lower than a threshold. In some implementations, this threshold may be a global threshold to be applied across a network or network section. In one particular example, a layer-wise threshold may be applied for a statistic-aware sparsification technique. For instance, in a statistic-aware sparsification, a layer-wise weight threshold may be computed (e.g., at each training pass (or iteration)) based on the current statistical distribution of the full-precision dense weights in each layer, with the system masking out weights in that layer that are less than the corresponding layer's threshold in each forward pass. In the corresponding backward pass (of the training iteration), the gradients of the sparsified weights may be pruned using the same mask. In one example, a layer-wise binary mask$_l^n$ (same size as weight $W_l^n$) may be used for $l^{th}$ layer at $n^{th}$ iteration (and as shown in the examples of Equation 1 and Equation 2 set forth below). This binary mask may be dynamically updated based on a layer-wise threshold and sparsity controlling factor σ (e.g., same for all layers). In this example, the mean and one standard deviation (std) of the full-precision dense weights in each layer are calculated to be a layer-wise threshold. This allows previously masked out weights back should it be determined (in subsequent training iterations) that one or more of the previously masked-out weights are actually more important (e.g., where $|W_l^n(i,j)|>t_l^n$). In some implementations, layer-by-layer pruning may be performed in sparsification. In other examples, all layers may be globally pruned, but according to layer-wise thresholds, which consider the different distribution of weights in each layer. Indeed, in some cases, a statistics-aware approach may perform better than globally pruning all layers with the same sparsity level, and perform comparably to layer-by-layer pruning but with many fewer training epochs.

$$\text{mask}_l^n = \begin{cases} 0 & \text{if } |W_l^n(i,j)| < t_l^n \\ 1 & \text{if } |W_l^n(i,j)| > t_l^n \end{cases} \quad \text{EQUATION 1}$$

$$t_l^n = \text{mean}(|W_l^n|) + std(|W_l^n|) \times \sigma \quad \text{EQUATION 2}$$

Sparsity controlling factor σ is a hyper-parameter in this statistic-aware pruning technique. Unlike an explicit level of target sparsity (e.g., prune 50% of all layers), a is implicitly determining sparsity level. The higher the value of a, the more sparsity is achieved (with an expected slight decrease in accuracy). For instance, in one example, a 30× compression rate may be achieved for a sparse and 4-bit model with approximately a 1% drop in accuracy, while 42× a compression rate is achieved for sparse and 2-bit model with a 2% drop in accuracy, among other examples.

As with the technique utilized to perform weight sparsification, a variety of different quantization techniques may be alternatively applied in various implementations of a single-iteration sparsification-quantization. For instance, in example case of a Q on S implementation, after masking out relatively less important weights through sparsification, the non-zero elements of sparsified weights may be quantized with low-bitwidth k, as shown. In one example, for weight quantization, a min-max uniform quantization function may be utilized without clipping to [−1, 1]. For instance, the min may be the previously determined layer-wise pruning threshold $t_1$, while the max is the maximum value of the sparse weights sparse$W_l^n$ in $l^{th}$ layer at $n^{th}$ iteration of training. Continuing with this particular example implementations, Equation 3 to Equation 6 shown below, show quantization of a full-precision non-zero element of sparse weight sparse$W_l^n(i,j)$ to k-bit $w_{sq}$:

$$\max = \max(|sparseW_l^n|), \quad \min = t_l^n \quad \text{EQUATION 3}$$

$$w_s = \frac{|sparseW_l^n(i,j)| - \min}{\max - \min} \quad \text{EQUATION 4}$$

$$w_q = \frac{1}{2^{k-1}-1}\text{round}((2^{k-1}-1)w_s) \quad \text{EQUATION 5}$$

$$w_{sq} = \text{sign}(sparseW_l^n(i,j))(w_q(\max - \min) + \min) \quad \text{EQUATION 6}$$

In one example, during the backward pass of a corresponding training iteration, in order to back-propagate the nondifferentiable quantization functions, a straight-through estimator (STE) approach may be utilized. Other gradient quantization techniques may be alternatively applied in other examples. In one specific example, an STE approach may be utilized in quantization of gradients, for instance, by approximating the partial gradient $$\frac{\partial w_q}{\partial w_s}$$

and $$\frac{\partial w_{sq}}{\partial w_q}$$

with an identity mapping, to be $$\frac{\partial w_q}{\partial w_s} \approx 1 \text{ and } \frac{\partial w_{sq}}{\partial w_q} \approx 1$$

respectively. In other words, the identity mapping may be used to simply pass through the gradient untouched to overcome the problem of the gradient of round( ) and sign( ) operations being zero almost everywhere, among other example implementations. In the case of activation quantization, a variety of techniques may also be applied. For instance, a static clipping or parameterized clipping technique (PACT) may be utilized, among other examples In some implementations, the quantization technique(s) applied may be based on whether the technique results in "free" sparsity, based on the system quantizing some weights to zero. Depending on quantization methods, there is a case that some weights are quantized to zero giving free sparsity. For instance, a WRPN quantization technique may be executed to quantize small weights to 0 due to clipping to [−1, 1] with implicit min of 0 and max of 1, while a DoReFaNet quantization technique is not necessary to map the same small weights to 0, due to prior tanh transformation before quantization. In some cases, due to the (disconnected) bi-modal distribution of sparse weights, a quantization algorithm may be employed (e.g., min-max quantization) to have finer quantization steps only on non-zero elements of sparse weights, which may, in turn, reduce quantization error, as such quantization approaches do not generate additional sparsity since the min value is always greater than zero and gets larger, as sparsity controlling a becomes larger, among other example considerations and implementations.

Figure 5:
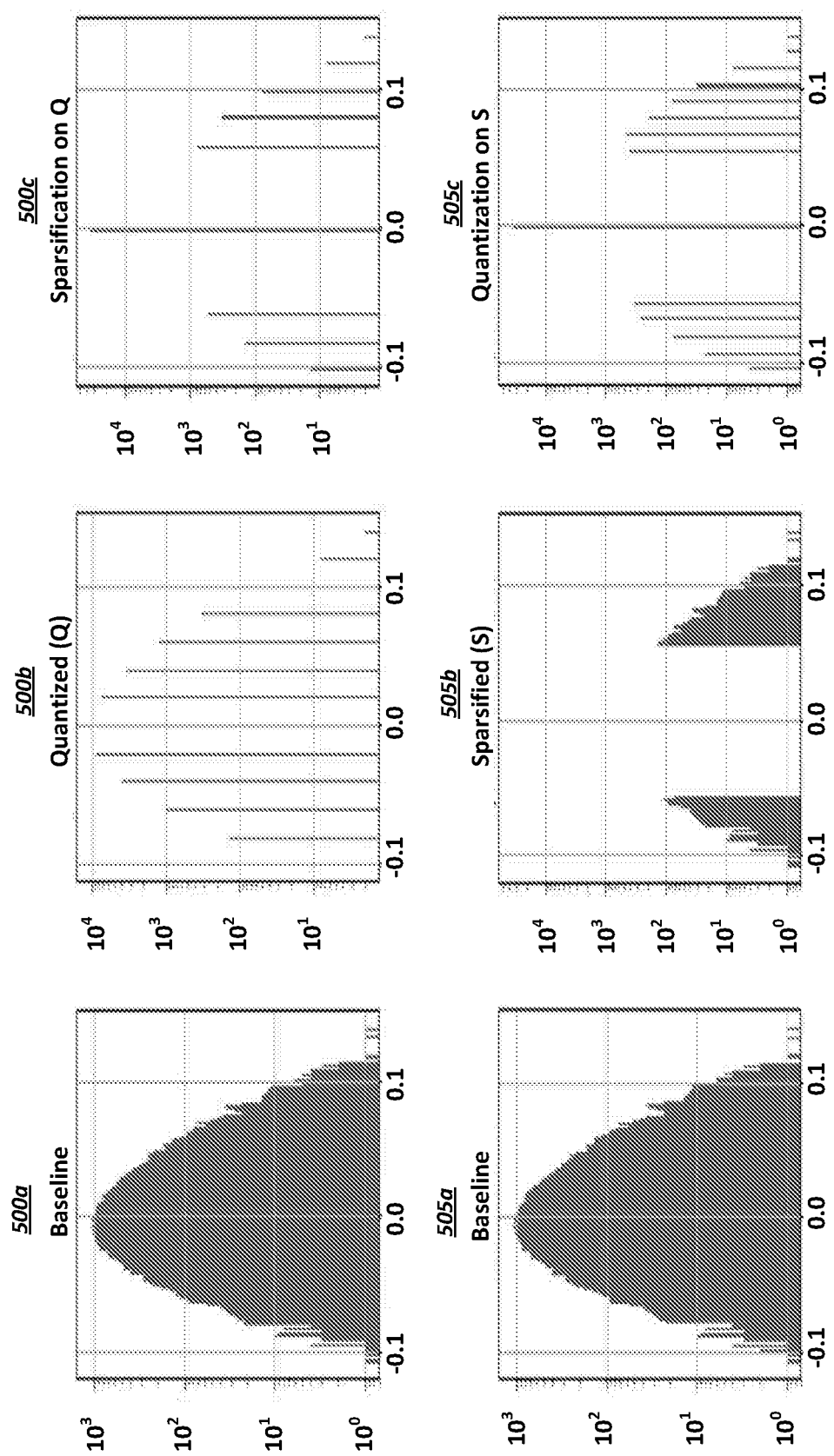
FIG. 5 shows example graphs comparing example compressions of a neural network model.

When performing weight sparsification and quantization within a single training pass (or iteration), either sparsification (in sparsification followed by quantization (Q on 5)) or quantization (in quantization followed by sparsification (S on Q)) may be performed first in the training pass, with the other performed immediately after within that same training pass. In some implementations, it may be advantageous to perform either sparsification or quantization to improve performance of the compression. Turning to FIG. 5, a set of graphs 500a-c, 505a-c are shown illustrating a comparison between performance of S on Q with Q on S compression of an example neural network model. For instance, in one example, a ResNet neural network model (e.g., ResNet56) may be compressed using a unified sparsification-quantization compression performed by a computing system.

In the particular illustrative example of FIG. 5, weight histograms are shown for a particular layer in the example neural network (e.g., layer3.5.conv2 layer (the last 3×3 convolutional layer in ResNet56)) before and after applying sparsification and quantization in the two different orders. Graphs 500a-c illustrate weight histograms of a S on Q approach, while graphs 505a-c show weight histograms of a Q on S approach. For instance, weight histogram graphs 500a-c show the histogram (500a) of the layer's full-precision baseline, histogram 500b shows the weights following 4-bit quantization, and histogram 500c shows the weights following sparsification of the 4-bit quantized weights. Similarly, graphs 505a-c show the progression of the weights in a Q on S approach, with 505a showing the layer's weights at full baseline precision, histogram 505b showing the weights following sparsification, and histogram 505c showing the weights following quantization of the sparsified weights (shown at 505b). In this illustration, from the histograms of S on Q, it is observed that all quantization levels are not fully utilized. For instance, although up to 24 levels may be utilized for 4-bit quantization, in this example, fewer levels are used due to the subsequent sparsification. In some sparsification techniques, the higher the sparsity that is achieved, the greater the number of quantization levels that will be underutilized. In other cases, such as where other sparsification techniques are used in the sparsification step, quantization may be performed first without s similar performance penalty. As an example, with random sparsification, all the levels may be utilized, and, in this case, the sparsification-quantization order is largely irrelevant. To contrast, when a magnitude-based sparsification technique is utilized with Q on S, the dynamic range of weights may be reduced, thereby reducing the quantization error with finer quantization steps, among other examples.

In some implementations, a Delay parameter may be defined to be applied within implementations of single-iteration sparsification-quantization to set a corresponding delay for the beginning of weight sparsification-quantization within the training (e.g., only applying weight sparsification-quantization after a number of training iterations have been completed). In one example, quantization of activations may begin earlier in training (e.g., from the start of training) than weight sparsification-quantization, which is delayed until a later point in the training. For instance, deferring weight sparsification-quantization (e.g., until Delay number of training iterations have completed) may assist in allowing weights stabilize at the start of training, thereby encouraging faster convergence during training of the neural network model. "Algorithm 1", shown below is one example implementation of a single-iterations sparsification-quantization ("SQuantization") that utilizes a Delay parameter to defer weight sparsification-quantization. In one example, a Delay value may be defined such that one third of total training iterations are completed before initiating weight sparsification-quantization. Indeed, such an approach may be beneficially applied across compression of different types of networks, where training from scratch with Delay performs better than training without Delay (e.g., where Delay allows enough time for weights to stabilize and fully adapt the quantized activation).

Figure 6:
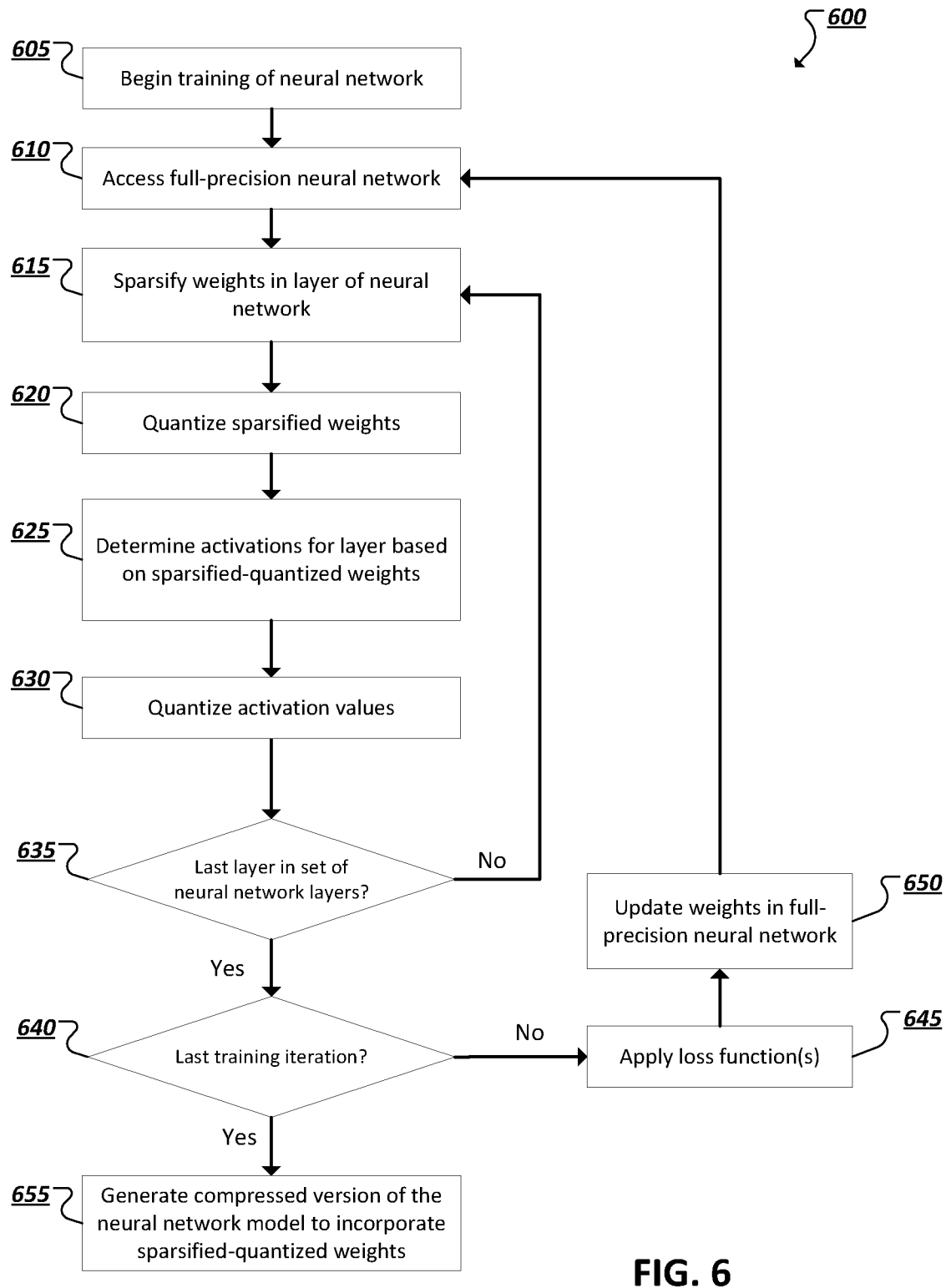
FIG. 6 is a flow diagram of an example technique for compressing a neural network model.

Algorithm 1 SQuantization for Sparse and k-Bit Quantized Neural Network
    Input: Training data, Delay, Sparsity controlling σ, Low-bitwidth k.
    Output: A sparse and k-bit quantized model $M_{SQ}^{sparse,k}$
    1: Step 1: Quantize Activation:
    2: for iter=1, . . . , Delay do
    3: Randomly sample mini-batch data
    4: $W_{full} \rightarrow W_{full}$
    5: $Act_{kbit} \rightarrow Act_{full}$
    6: Calculate loss with cross-entropy and weight decay
    7: Update $W_{full}$
    8: end for
    9: Step 2: SQuantize weights and activations to k-bit:
    10: for iter=Delay, . . . , T do
    11: Randomly sample mini-batch data
    12: $W_{sparse} \rightarrow W_{full}$ with a
    13: $W_{sparse,quantized} \rightarrow W_{sparse}$ with k-bit
    14: $Act_{kbit} \rightarrow Act_{full}$ 15: Calculate loss with cross-entropy and weight decay
16: Update $W_{full}$
17: end for FIG. 6 is a simplified flow diagram 600 illustrating an example technique for generating a compressed version of a neural network model (e.g., a convolutional neural network or another deep neural network). For instance, training of a neural network model may begin 605, with a full-precision version of the neural network being accessed 610 and training data provided as inputs to the neural network. The original version of the neural network may be "full precision" in that the number of channels/weights and level of precision of the weights' values are at an original, high level (e.g., without making sacrifices to accommodate systems, which may not have the processing or memory bandwidth to efficiently or reliably use the original version of the neural network). During at least a subset of the training iterations to be performed during the training, weights of one or more layers may be sparsified 615 during corresponding forward passes of the training iteration. The sparsification may be according to a layer-wise statistic aware sparsification (or pruning) technique (among other example sparsification techniques), which results in a subset of the weights of the corresponding layer being removed (at least for this particular training iteration). The sparsified weights (those remaining for the layer following removal of the subset of weights) may then be quantized 620 within the same forward pass of the corresponding training iteration to convert the values of the remaining weights from a first, higher level of precision (e.g., 32-bit floating point) to a lower level of precision (e.g., 4-bit). The quantization 620 of the remaining weights results in a sparsified-quantized set of weights being determined for the particular layer in the corresponding training iteration. Activations may be determined 625 using the sparsified-quantized set of weights (e.g., through a convolution of a preceding layer's activations with the sparsified-quantized set of weights) and these activations may be quantized 630 (e.g., consistent with the quantization 620 of the sparsified weights).

More than one layer of the neural network model may be subjected to compression. For instance, single-training-iteration weight sparsification (615) and quantization (620) may be performed for each of these layers during each training iteration. Similarly, during the forward pass of the corresponding training iteration, respective activations may be determined (625) and quantized (630), until all of the subject layers have been compressed within the training iteration. Numerous training iterations may be performed to adequately train the neural network model to a desired or sufficient level of accuracy. When the forward pass of the training iteration progresses through the last of the layers (at 635) of the model, it may be determined (at 640) if the training iteration is the final training iteration or if an additional training iteration is to be performed. If the current training iteration is determined 640 to be the last training iteration, the sparsified-quantized set of weights determined for each layer of the network (to which compression is applied) may be adopted as the "final" weights of the compressed version of the original neural network generated 655 from the training. Alternatively, to progress to the next training iteration, a backward pass of the training iteration may be performed, for instance, by applying a loss function 645 to the activations determined 625 for the corresponding layer and by updating 650 weights of the full-precision version of that layer based on results of the loss function 645. The updated weights of the full-precision version of the neural network may then be accessed 610, and an additional round of single-iteration sparsification-quantization (e.g., 615, 620) performed based on the updated full-precision weights, with this cycle repeating, training iteration-by-training iteration, until the training is completed and a compressed (e.g., sparsified-quantized) version of the neural network is determined 655, The compressed version of the neural network may then be utilized by consumed computing systems (e.g., resource constrained systems, robotics systems, drone systems, etc.), allowing a much "lighter" model with only minor tradeoffs in overall accuracy, among other example advantages and implementations.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 7-13 are block diagrams of exemplary computer architectures that may be used in accordance with embodiments disclosed herein. Indeed, computing devices, processors, and other logic and circuitry of the systems described herein may incorporate all or a portion of the functionality and supporting software and/or hardware circuitry to implement such functionality. Further, other computer architecture designs known in the art for processors and computing systems may also be used beyond the examples shown here. Generally, suitable computer architectures for embodiments disclosed herein can include, but are not limited to, configurations illustrated in FIGS. 7-13.

Figure 7:
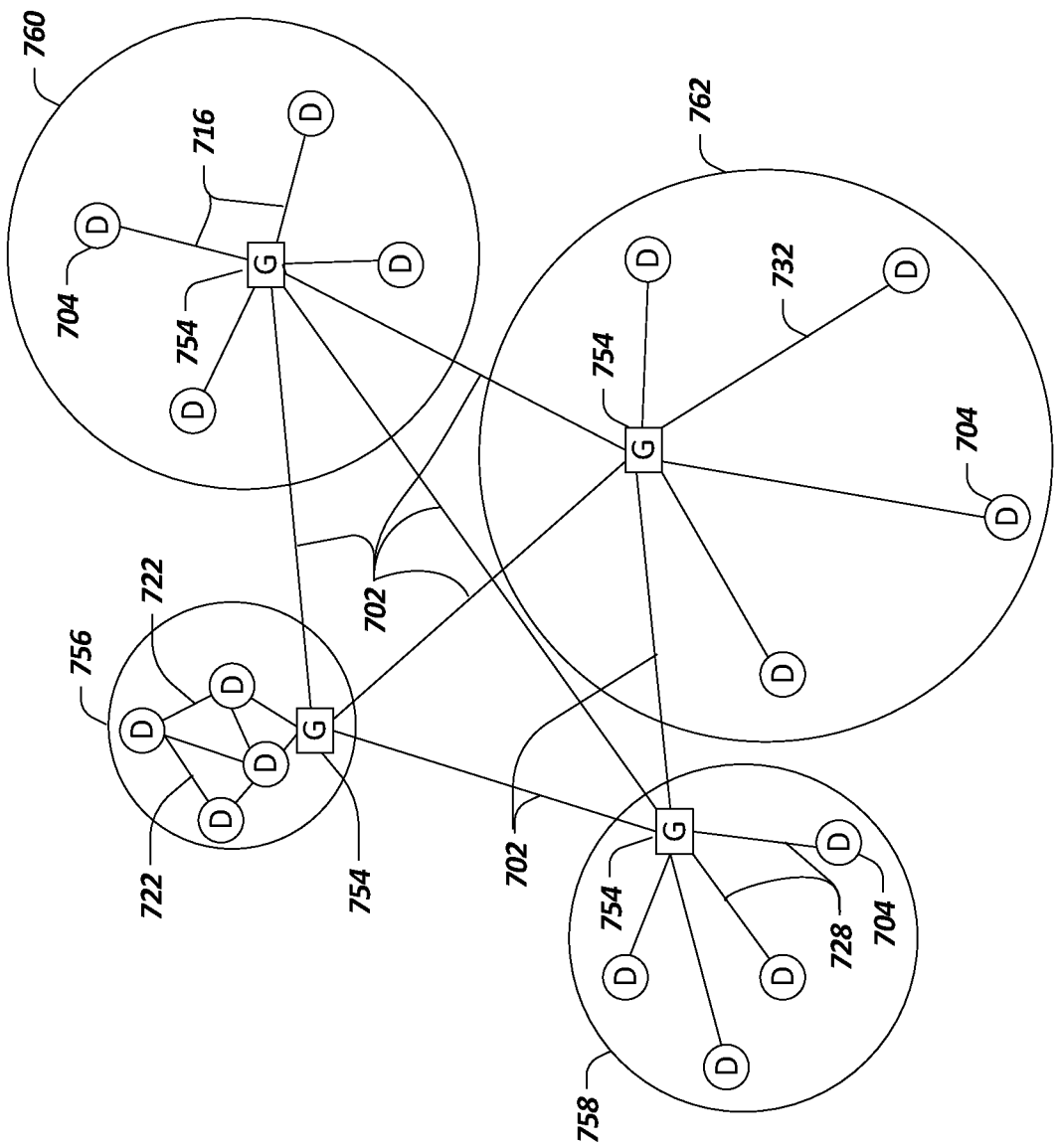
FIG. 7 is a simplified block diagram of an exemplary network with devices in accordance with at least some embodiments.

FIG. 7 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. Such IoT devices may be equipped with logic and memory to implement and use hash tables, such as introduced above.

Often, IoT devices are limited in memory, size, or functionality, allowing larger numbers to be deployed for a similar cost to smaller numbers of larger devices. However, an IoT device may be a smart phone, laptop, tablet, or PC, or another larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 8:
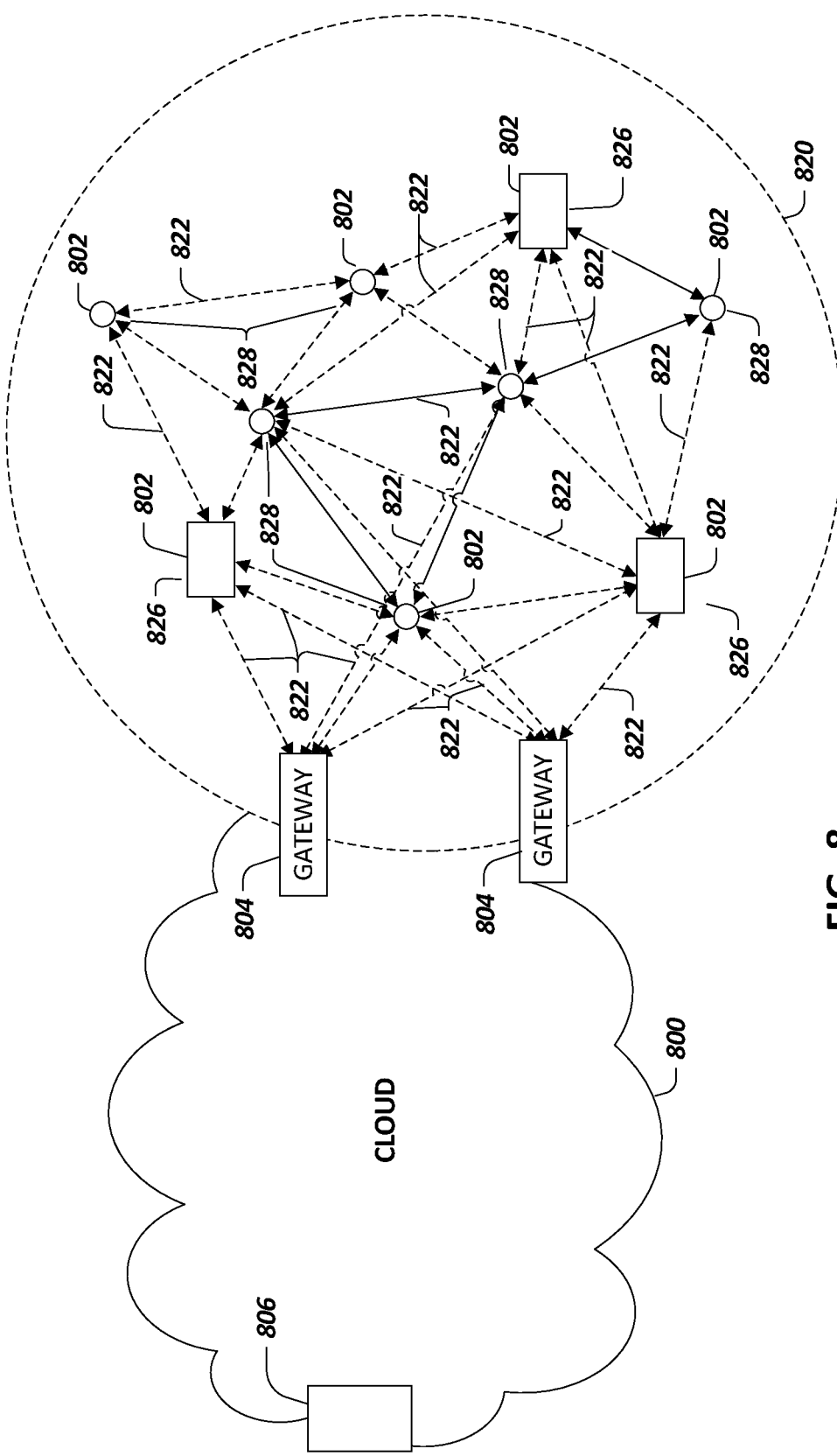
FIG. 8 is a simplified block diagram of an exemplary fog or cloud computing network in accordance with at least some embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 7 and 8, present a number of new challenges in a heterogeneous network of connectivity comprising a combination of wired and wireless technologies.

FIG. 7 specifically provides a simplified drawing of a domain topology that may be used for a number of internet-of-things (IoT) networks comprising IoT devices 704, with the IoT networks 756, 758, 760, 762, coupled through backbone links 702 to respective gateways 754. For example, a number of IoT devices 704 may communicate with a gateway 754, and with each other through the gateway 754. To simplify the drawing, not every IoT device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both IoT devices 704 and gateways 754, including the use of MUXing/deMUXing components that facilitate interconnection of the various devices.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with IoT devices 704 through IEEE 802.11 (Wi-Fi®) links 728, a cellular network 760 used to communicate with IoT devices 704 through an LTE/LTE-A (4G) or 5G cellular network, and a low-power wide area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 704, such as over the backbone links 702, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

The WLAN network 758, for instance, may use systems that perform standards conversion to provide multi-standard connectivity, enabling IoT devices 704 using different protocols to communicate. Further systems may provide seamless interconnectivity across a multi-standard infrastructure comprising visible Internet resources and hidden Internet resources.

Communications in the cellular network 760, for instance, may be enhanced by systems that offload data, extend communications to more remote devices, or both. The LPWA network 762 may include systems that perform non-Internet protocol (IP) to IP interconnections, addressing, and routing. Further, each of the IoT devices 704 may include the appropriate transceiver for wide area communications with that device. Further, each IoT device 704 may include other transceivers for communications using additional protocols and frequencies. This is discussed further with respect to the communication environment and hardware of an IoT processing device, such as depicted in the examples herein.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 8 below.

FIG. 8 illustrates a cloud computing network in communication with a mesh network of IoT devices (devices 802) operating as a fog device at the edge of the cloud computing network. The mesh network of IoT devices may be termed a fog 820, operating at the edge of the cloud 800. To simplify the diagram, not every IoT device 802 is labeled.

The fog 820 may be considered to be a massively interconnected network wherein a number of IoT devices 802 are in communications with each other, for example, by radio links 822. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 802 are shown in this example, gateways 804, data aggregators 826, and sensors 828, although any combinations of IoT devices 802 and functionality may be used. The gateways 804 may be edge devices that provide communications between the cloud 800 and the fog 820, and may also provide the backend process function for data obtained from sensors 828, such as motion data, flow data, temperature data, and the like. The data aggregators 826 may collect data from any number of the sensors 828, and perform the back-end processing function for the analysis. The results, raw data, or both may be passed along to the cloud 800 through the gateways 804. The sensors 828 may be full IoT devices 802, for example, capable of both collecting data and processing the data. In some cases, the sensors 828 may be more limited in functionality, for example, collecting the data and allowing the data aggregators 826 or gateways 804 to process the data.

Communications from any IoT device 802 may be passed along a convenient path (e.g., a most convenient path) between any of the IoT devices 802 to reach the gateways 804. In these networks, the number of interconnections provide substantial redundancy, allowing communications to be maintained, even with the loss of a number of IoT devices 802. Further, the use of a mesh network may allow IoT devices 802 that are very low power or located at a distance from infrastructure to be used, as the range to connect to another IoT device 802 may be much less than the range to connect to the gateways 804.

The fog 820 provided from these IoT devices 802 may be presented to devices in the cloud 800, such as a server 806, as a single device located at the edge of the cloud 800, e.g., a fog device. In this example, the alerts coming from the fog device may be sent without being identified as coming from a specific IoT device 802 within the fog 820. In this fashion, the fog 820 may be considered a distributed platform that provides computing and storage resources to perform processing or data-intensive tasks such as data analytics, data aggregation, and machine-learning, among others.

In some examples, the IoT devices 802 may be configured using an imperative programming style, e.g., with each IoT device 802 having a specific function and communication partners. However, the IoT devices 802 forming the fog device may be configured in a declarative programming style, allowing the IoT devices 802 to reconfigure their operations and communications, such as to determine needed resources in response to conditions, queries, and device failures. As an example, a query from a user located at a server 806 about the operations of a subset of equipment monitored by the IoT devices 802 may result in the fog 820 device selecting the IoT devices 802, such as particular sensors 828, needed to answer the query. The data from these sensors 828 may then be aggregated and analyzed by any combination of the sensors 828, data aggregators 826, or gateways 804, before being sent on by the fog 820 device to the server 806 to answer the query. In this example, IoT devices 802 in the fog 820 may select the sensors 828 used based on the query, such as adding data from flow sensors or temperature sensors. Further, if some of the IoT devices 802 are not operational, other IoT devices 802 in the fog 820 device may provide analogous data, if available.

In other examples, the operations and functionality described above may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. In some implementations, one or more multiple devices may operate cooperatively to implement functionality and perform tasks described herein. In some cases, one or more host devices may supply data, provide instructions, aggregate results, or otherwise facilitate joint operations and functionality provided by multiple devices. While functionality, when implemented by a single device, may be considered functionality local to the device, in implementations of multiple devices operating as a single machine, the functionality may be considered local to the devices collectively, and this collection of devices may provide or consume results provided by other, remote machines (implemented as a single device or collection devices), among other example implementations.

Figure 9:
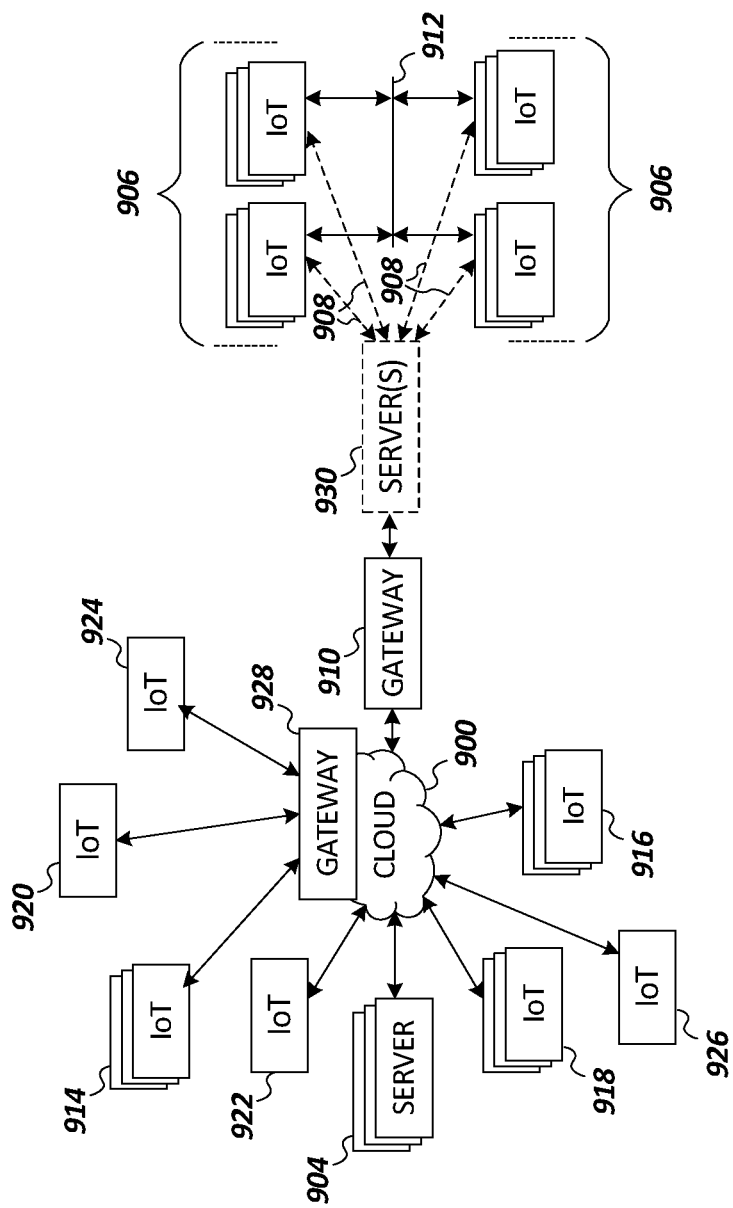
FIG. 9 is a simplified block diagram of a system including example devices in accordance with at least some embodiments.

For instance, FIG. 9 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 8), or a combination therein. The groups of IoT devices may be deployed in various residential, commercial, and industrial settings (including in both private or public environments).

As can be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 8).

Figure 10:
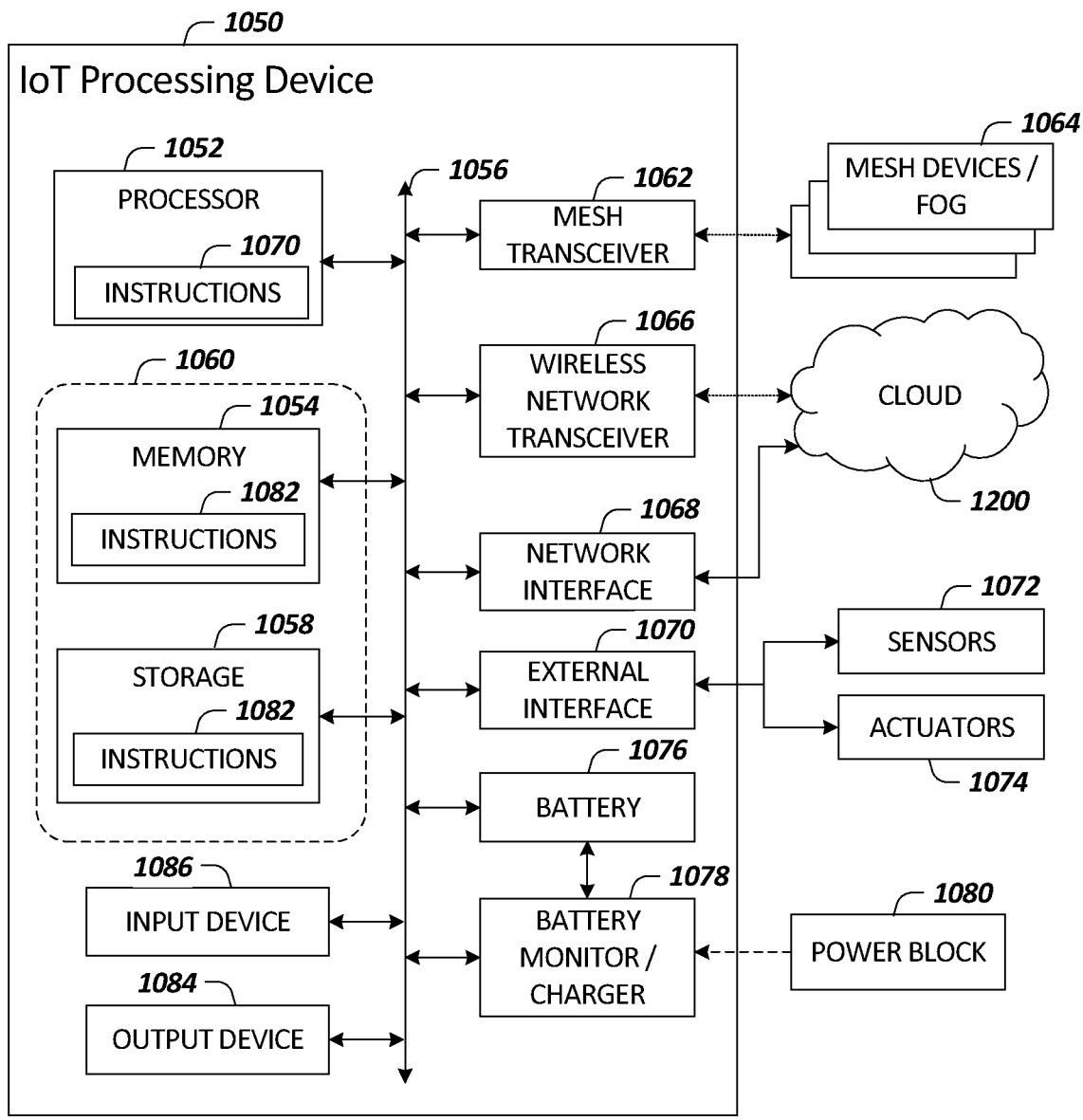
FIG. 10 is a simplified block diagram of an example processing device in accordance with at least some embodiments.

FIG. 10 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid-state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee© standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, California, among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 10 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram(s) of operations and functionality depicted above.

Figure 11:
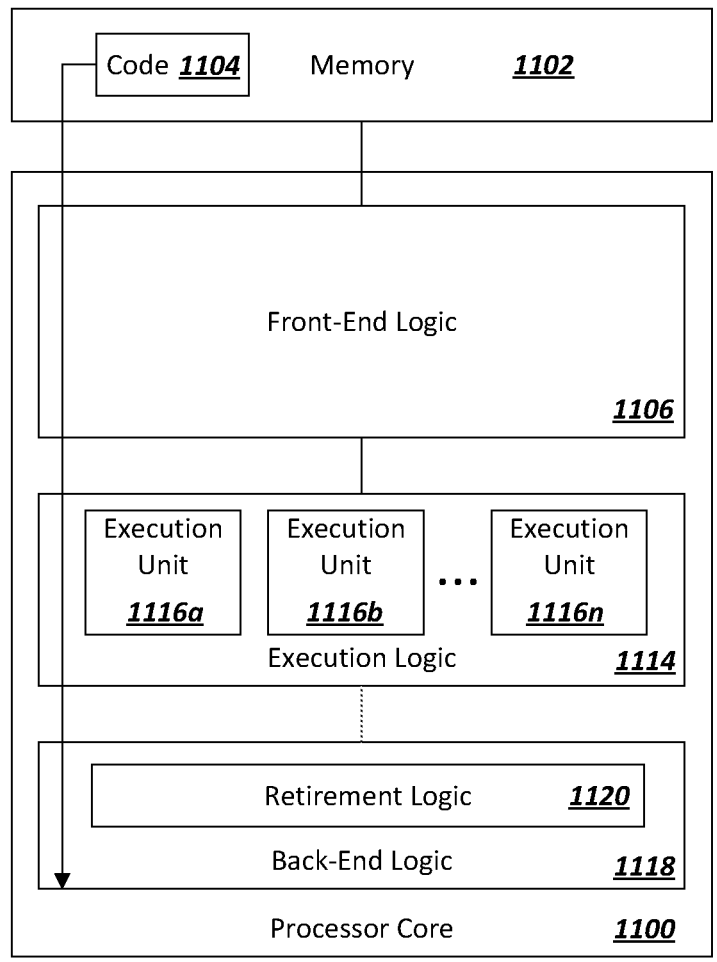
FIG. 11 is a block diagram of an exemplary processor in accordance with at least some embodiments.

FIG. 11 is an example illustration of a processor according to an embodiment. Processor 1100 is an example of a type of hardware device that can be used in connection with the implementations above. Processor 1100 may be any type of processor, such as a microprocessor, an embedded processor, a digital signal processor (DSP), a network processor, a multi-core processor, a single core processor, or other device to execute code. Although only one processor 1100 is illustrated in FIG. 11, a processing element may alternatively include more than one of processor 1100 illustrated in FIG. 11. Processor 1100 may be a single-threaded core or, for at least one embodiment, the processor 1100 may be multi-threaded in that it may include more than one hardware thread context (or "logical processor") per core.

FIG. 11 also illustrates a memory 1102 coupled to processor 1100 in accordance with an embodiment. Memory 1102 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1100 can execute any type of instructions associated with algorithms, processes, or operations detailed herein. Generally, processor 1100 can transform an element or an article (e.g., data) from one state or thing to another state or thing.

Code 1104, which may be one or more instructions to be executed by processor 1100, may be stored in memory 1102, or may be stored in software, hardware, firmware, or any suitable combination thereof, or in any other internal or external component, device, element, or object where appropriate and based on particular needs. In one example, processor 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 also includes register renaming logic 1110 and scheduling logic 1112, which generally allocate resources and queue the operation corresponding to the instruction for execution.

Processor 1100 can also include execution logic 1114 having a set of execution units 1116a, 1116b, 1116n, etc. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor 1100 allows out of order execution but requires in order retirement of instructions. Retirement logic 1120 may take a variety of known forms (e.g., re-order buffers or the like). In this manner, processor 1100 is transformed during execution of code 1104, at least in terms of the output generated by the decoder, hardware registers and tables utilized by register renaming logic 1110, and any registers (not shown) modified by execution logic 1114.

Although not shown in FIG. 11, a processing element may include other elements on a chip with processor 1100. For example, a processing element may include memory control logic along with processor 1100. The processing element may include I/O control logic and/or may include I/O control logic integrated with memory control logic. The processing element may also include one or more caches. In some embodiments, non-volatile memory (such as flash memory or fuses) may also be included on the chip with processor 1100.

Figure 12:
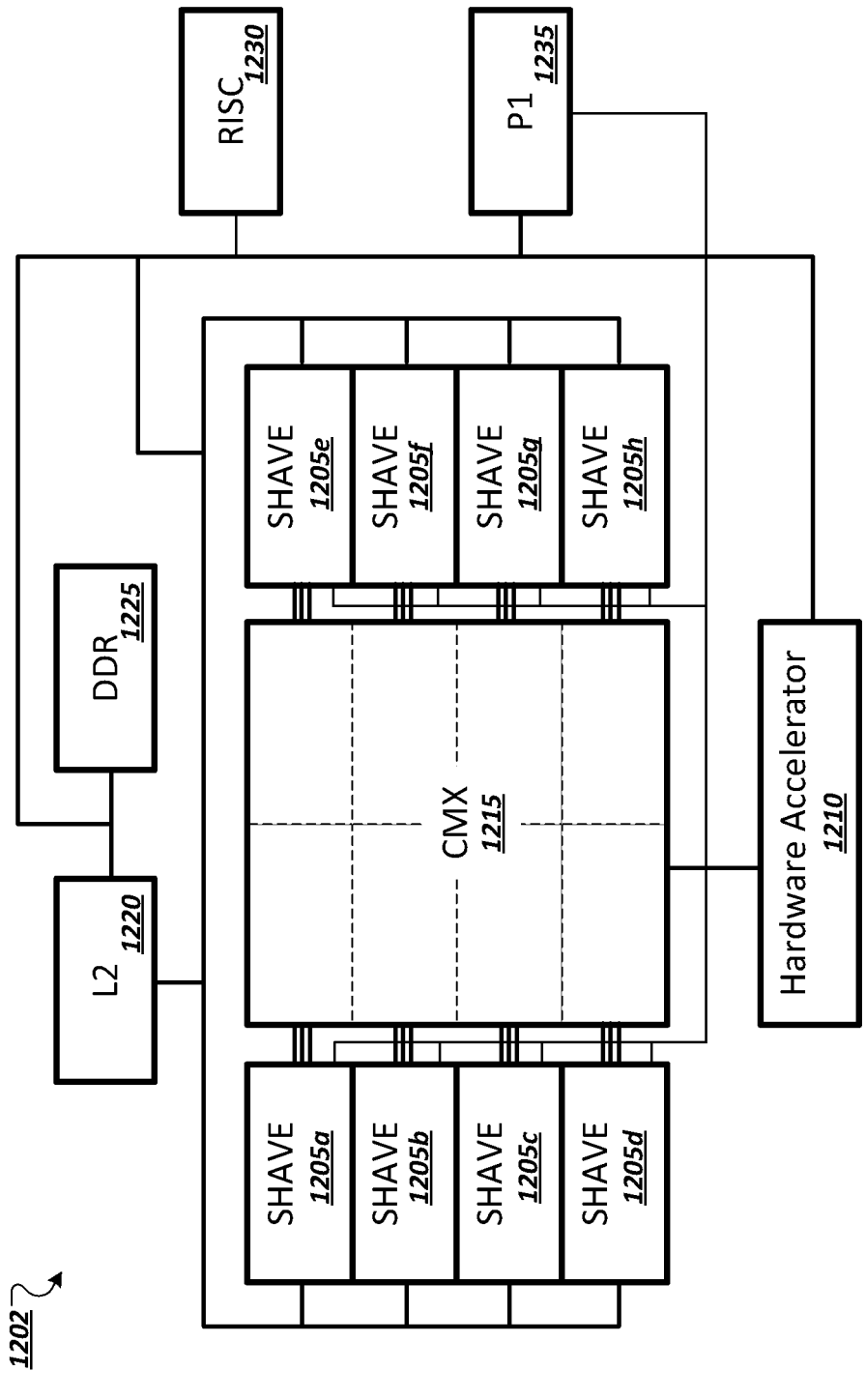
FIG. 12 is a simplified block diagram of an example machine learning device in accordance with some embodiments.

FIG. 12 is a simplified block diagram 1200 of an example machine learning processing device 1202, in accordance with some example implementations. Such machine learning processing devices (e.g., 1202) and other hardware configured to perform machine learning-related operations may be utilized to perform all or a portion of the operations (e.g., convolutions, weight updates, etc.) included in the example sparsification-quantization training iterations and other neural network compression techniques discussed above, among other example operations (including the use of compressed neural network models using sparsification-quantization). In this particular example, a machine learning device 1202 may implement a VPU that includes a set of special-purpose processors 1205*a-h*, a machine learning accelerator 1210, and non-standard memory hierarchy 1215, and multiple types of memory (e.g., 1220, 1225). For instance, multiple processors 1205*a-h* (e.g., Streaming Hybrid Architecture Vector Engine (SHAVE) processors) may share a multiport memory subsystem 1215 in accordance with some embodiments. Such processors 1205*a-h* may be implemented as proprietary or special-purpose processors with very long instruction word (VLIW) instruction sets, among other examples. The memory subsystem 1215 may be implemented as a collection of memory slices, referred to herein as "connection matrix" (CMX) slices. CMX memory 1215 may be implemented as fast, local memory (e.g., SDRAM) and can embody scratchpad memory usable by individual processors (e.g., 1205*a-h*). Layer 2 (L2) cache 1220 and DDR memory 1225 may be further provided as more general-purpose, or system, memory, in this example. Further an example machine learning processing device may further include a reduced instruction set computer (RISC) element 1230, as well as other processor devices (e.g., 1235).

One or more hardware accelerator devices (e.g., 1210) may be included in or coupled to the machine learning processing device. Such accelerator devices may be fixed-function hardware accelerators configured particularly to support matrix arithmetic, particular machine learning operations, or other specialized functions to enhance the overall capabilities of the machine learning processing device 1202. In one example, the accelerator device may itself include a number of data processing units (DPUs), which may connect to and also make use of the memory subsystem 1215, among other example features and components. In the example of FIG. 12, example memory subsystem 1215 may include or define specific memory regions where specific tensor types are required to reside (e.g., populated, unpopulated, network input and output tensors).

In some implementations, each SHAVE processor (e.g., 1205*a-h*) can include two load store units by which data may be loaded from and stored to CMX slices of the memory subsystem memory 1215. Each memory slice may be associated with a corresponding one of SHAVE processors (e.g., 1205*a-h*). Further, each SHAVE processors (e.g., 1205*a-h*) can also include an instruction unit into which instructions may be loaded. A particular embodiment in which the processor includes a SHAVE, the SHAVE can include one or more of a reduced instruction set computer (RISC), a digital signal processor (DSP), a very long instruction word (VLIW), and/or a graphics processing unit (GPU). An example machine learning processing device may additional include an interconnection system that couples the processors 1205*a-h* and the memory slices of memory 1215. The interconnection system may be referred to as an inter-shave interconnect (ISI). The ISI can include a bus through which processors (e.g., 1205*a-h*) can read or write data to any part of any one of the memory slices of memory 1215, among other example communications and transactions.

Figure 13:
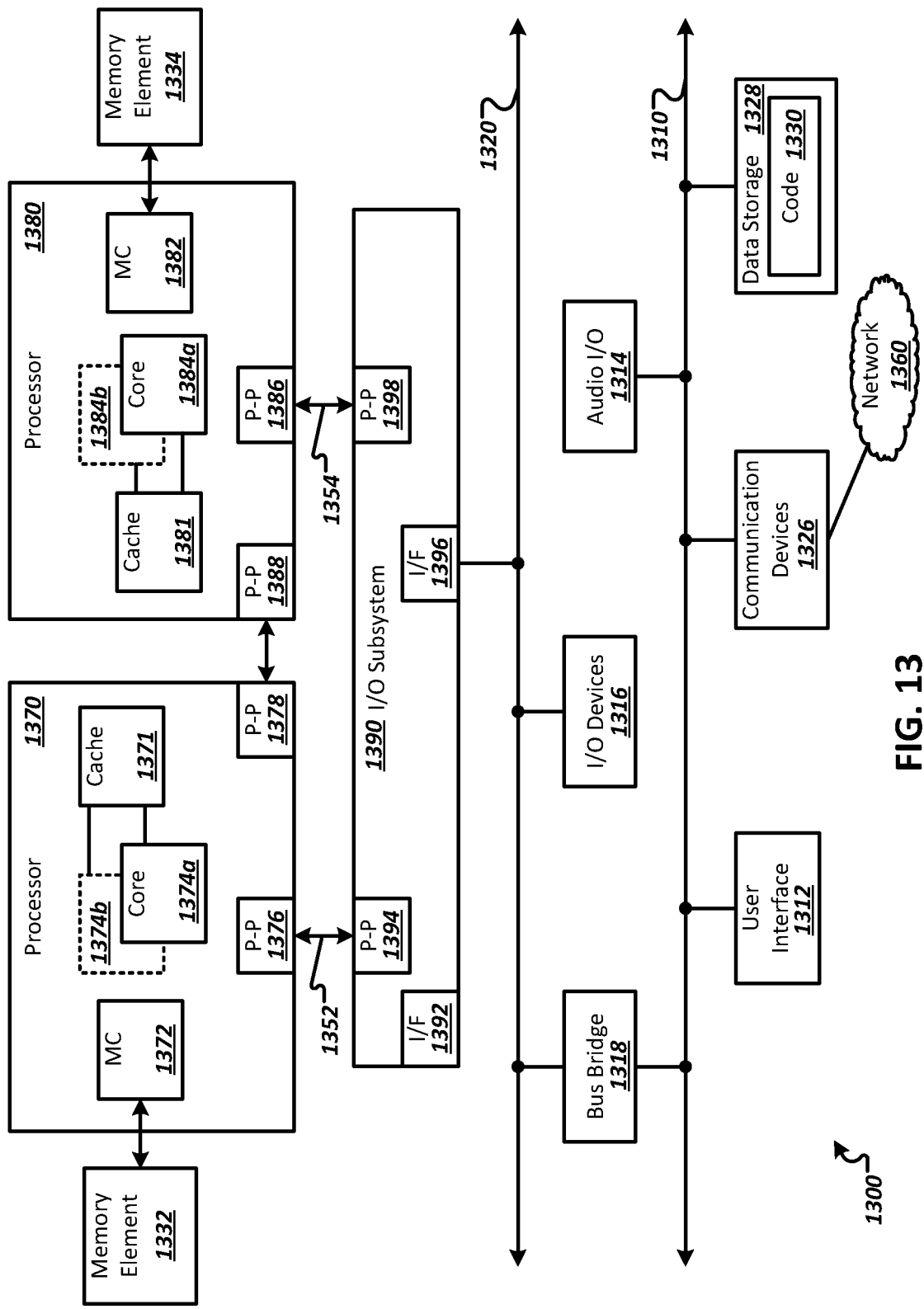
FIG. 13 is a block diagram of an exemplary computing system in accordance with at least some embodiments.

FIG. 13 illustrates a computing system 1300 that is arranged in a point-to-point (PtP) configuration according to an embodiment. In particular, FIG. 13 shows a system where processors, memory, and input/output devices are interconnected by a number of point-to-point interfaces. Generally, one or more of the computing systems described herein may be configured in the same or similar manner as computing system 1300.

Processors 1370 and 1380 may also each include integrated memory controller logic (MC) 1372 and 1382 to communicate with memory elements 1332 and 1334. In alternative embodiments, memory controller logic 1372 and 1382 may be discrete logic separate from processors 1370 and 1380. Memory elements 1332 and/or 1334 may store various data to be used by processors 1370 and 1380 in achieving operations and functionality outlined herein.

Processors 1370 and 1380 may be any type of processor, such as those discussed in connection with other figures. Processors 1370 and 1380 may exchange data via a point-to-point (PtP) interface 1350 using point-to-point interface circuits 1378 and 1388, respectively. Processors 1370 and 1380 may each exchange data with a chipset 1390 via individual point-to-point interfaces 1352 and 1354 using point-to-point interface circuits 1376, 1386, 1394, and 1398. Chipset 1390 may also exchange data with a high-performance graphics circuit 1338 via a high-performance graphics interface 1339, using an interface circuit 1392, which could be a PtP interface circuit. In alternative embodiments, any or all of the PtP links illustrated in FIG. 13 could be implemented as a multi-drop bus rather than a PtP link.

Chipset 1390 may be in communication with a bus 1320 via an interface circuit 1396. Bus 1320 may have one or more devices that communicate over it, such as a bus bridge 1318 and I/O devices 1316. Via a bus 1310, bus bridge 1318 may be in communication with other devices such as a user interface 1312 (such as a keyboard, mouse, touchscreen, or other input devices), communication devices 1326 (such as modems, network interface devices, or other types of communication devices that may communicate through a computer network 1360), audio I/O devices 1314, and/or a data storage device 1328. Data storage device 1328 may store code 1330, which may be executed by processors 1370 and/or 1380. In alternative embodiments, any portions of the bus architectures could be implemented with one or more PtP links.

The computer system depicted in FIG. 13 is a schematic illustration of an embodiment of a computing system that may be utilized to implement various embodiments discussed herein. It will be appreciated that various components of the system depicted in FIG. 13 may be combined in a system-on-a-chip (SoC) architecture or in any other suitable configuration capable of achieving the functionality and features of examples and implementations provided herein.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a non-transitory machine-readable storage medium with instructions stored thereon, where the instructions are executable by a machine to cause the machine to: access data including a definition of a neural network model, where the neural network model includes a plurality of layers, and each of the plurality of layers includes a respective set of weights; access training data for use in training of the neural network model, where the training includes a plurality of training iterations; determine a subset of the weights to remove from a particular one of the plurality of layers; prune the weights of the particular layer to remove the subset of weights from the particular layer during a forward pass of a particular one of the training iterations, where removing the subset of weights results in a sparsified subset of weights remaining in the particular layer; quantize values of at least a portion of the weights of the particular layer during the forward pass of the particular training iteration, where after the forward pass the particular layer includes a quantized-sparsified subset of weights; and generate, from the training, a compressed version of the neural network model based on the quantized-sparsified subset of weights.

Example 2 includes the subject matter of example 1, where removal of the subset of weights precedes quantization of the values in the forward pass of the particular training iteration.

Example 3 includes the subject matter of any one of examples 1-2, where the instructions, when executed, further cause the machine to: convolve the quantized-sparsified subset of weights, during the forward pass of the particular training iteration, with activations generated by another layer in the plurality of layers to generate activations of the particular layer; and quantize values of activations of the particular layer during the forward pass of the particular training iteration.

Example 4 includes the subject matter of any one of examples 1-3, where the subset of weights are determined based on values of the subset of weights falling outside a threshold.

Example 5 includes the subject matter of example 4, where the instructions, when executed, further cause the machine to determine, for the particular layer, the threshold, where the threshold for the particular layer is different from thresholds determined for one or more other layers in the plurality of layers.

Example 6 includes the subject matter of example 5, where the threshold is determined for the particular layer based on statistical metrics based on full-precision weights of the particular layer at the particular training iteration.

Example 7 includes the subject matter of any one of examples 4-6, where the instructions, when executed, further cause the machine to determine the threshold, where the threshold is determined for the particular training iteration, and the threshold is determined to be different for another one of the plurality of training iterations.

Example 8 includes the subject matter of example 7, where the threshold is determined for the particular layer, and thresholds determined for the particular layer are different from thresholds determined for one or more other layers in the plurality of layers.

Example 9 includes the subject matter of any one of examples 1-8, where the instructions, when executed, further cause the machine to: identify a delay parameter; and perform the training of the neural network model, where a first portion of the plurality of training iterations are performed without compression of layers of the neural network model based on the delay parameter, and compression of the layers of the neural network model begin following completion of the first portion of the plurality of training iterations, where the compression of the layers of the neural network model includes removing the subset of weights from the particular layer and quantizing values of at least the portion of the weights of the particular layer.

Example 10 includes the subject matter of example 9, where the delay parameter includes a number of training iterations corresponding to the first portion of the plurality of training iterations.

Example 11 includes the subject matter of any one of examples 1-10, where the values of the weights are quantized using min-max quantization.

Example 12 includes the subject matter of any one of examples 1-11, where the compressed version of the neural network model includes layers with sparsified-quantized weights, and the sparsified-quantized weights include a particular subset of weights in a full-precision version of the neural network model, and values of the particular subset of weights are quantized relative to values of weights in the full-precision version.

Example 13 includes the subject matter of example 12, where the particular training iteration further includes a backward propagation based on a loss function, and full-precision weights of the full-precision version of the neural network model are to be updated based on results of the loss function.

Example 14 includes the subject matter of any one of examples 1-13, where a respective sparsified subset of weights is to be generated by pruning weights of each one of the plurality of layers, and each sparsified subset of weights for the plurality of layers is to be quantized to generate a respective quantized-sparsified subset of weights for each one of the plurality of layers.

Example 15 includes the subject matter of any one of examples 1-14, where the neural network model includes a convolutional neural network.

Example 16 is a method including: performing a plurality of a training iterations using a set of training data to train a neural network model, where each of the plurality of training iterations includes a respective forward pass and a respective backward pass, and the neural network model includes a plurality of layers; in each one of the plurality of training iterations: determining a respective subset of weights of a particular one of the plurality of layer to remove; pruning the particular layer to remove the subset of weights in the forward pass of the corresponding training iteration, where weights of the particular layer remaining after removal of the subset of weights include sparsified weights of the particular layer; quantizing values of the sparsified weights of the particular layer from a higher precision to a lower precision to form a respective sparsified-quantized set of weights for the particular layer; determining activation values for the particular layer based on the sparsified-quantized set of weights; and performing backpropagation using the activation values during the corresponding backward pass; and generating a compressed version of the neural network model based on the training.

Example 17 includes the subject matter of example 16, where the particular layer in the compressed version of the neural network model includes fewer weights than an original version of the particular layer in the neural network model, and the fewer weights are quantized to the lower precision in the compressed version of the neural network model.

Example 18 includes the subject matter of any one of examples 16-17, further including, in each of the training iterations: performing a loss function based on the corresponding activation values determined for the particular layer; determining one or more gradients associated with the particular layer based on the loss function; and updating a full-precision version of the particular layer based on the gradients, where the updated full-precision version of the particular layer is to be used in a subsequent one of the plurality of training iterations.

Example 19 includes the subject matter of any one of examples 16-18, further including: convolving the quantized-sparsified subset of weights, during the forward pass of the particular training iteration, with activations generated by another layer in the plurality of layers to generate activations of the particular layer; and quantizing values of activations of the particular layer during the forward pass of the particular training iteration.

Example 20 includes the subject matter of any one of examples 16-19, where the subset of weights are determined based on values of the subset of weights falling outside a threshold.

Example 21 includes the subject matter of example 20, further including determining, for the particular layer, the threshold, where the threshold for the particular layer is different from thresholds determined for one or more other layers in the plurality of layers.

Example 22 includes the subject matter of example 21, where the threshold is determined for the particular layer based on statistical metrics based on full-precision weights of the particular layer at the particular training iteration.

Example 23 includes the subject matter of example 20, where the instructions, when executed, further cause the machine to determine the threshold, where the threshold is determined for the particular training iteration, and the threshold is determined to be different for another one of the plurality of training iterations.

Example 24 includes the subject matter of example 23, where the threshold is determined for the particular layer, and thresholds determined for the particular layer are different from thresholds determined for one or more other layers in the plurality of layers.

Example 25 includes the subject matter of any one of examples 16-24, further including: identifying a delay parameter; and performing the training of the neural network model, where a first portion of the plurality of training iterations are performed without compression of layers of the neural network model based on the delay parameter, and compression of the layers of the neural network model begin following completion of the first portion of the plurality of training iterations, where the compression of the layers of the neural network model includes removing the subset of weights from the particular layer and quantizing values of at least the portion of the weights of the particular layer.

Example 26 includes the subject matter of example 25, where the delay parameter includes a number of training iterations corresponding to the first portion of the plurality of training iterations.

Example 27 includes the subject matter of any one of examples 16-26, where the values of the weights are quantized using min-max quantization.

Example 28 includes the subject matter of any one of examples 16-27, where a respective sparsified subset of weights is to be generated by pruning weights of each one of the plurality of layers, and values of each sparsified subset of weights for the plurality of layers is to be quantized to generate a respective quantized-sparsified subset of weights for each one of the plurality of layers.

Example 29 includes the subject matter of any one of examples 16-28, where the neural network model includes a convolutional neural network.

Example 30 is a system including means to perform the method of any one of examples 16-29.

Example 31 includes the subject matter of example 30, where the means comprise components of one or more of the systems illustrated in FIGS. 10-13.

Example 32 is a system including: a data processor; a memory; and a neural network compression engine executable by the data processor to perform training of a neural network model, where the training of the neural network model generates a compressed version of the neural network model and includes: a plurality of training iterations, where each of the plurality of training iterations includes a forward pass and a backward pass; weight sparsification to prune weights of at least one particular layer of the neural network model, where the weight sparsification removes a subset of the weights based on a threshold value for weights in the particular layer, and the weight sparsification is performed in a forward pass of a particular one of the plurality of training iterations; and quantization of weights of the particular layer, where the weight sparsification and quantization of weights generate a quantized-sparsified set of weights for the particular layer, where the quantization of weights is also performed in the forward pass of the particular training iteration.

Example 33 includes the subject matter of example 32, where the training further includes: determination of activations for the particular layer in the forward pass of the particular training iteration; and quantization of the activations.

Example 34 includes the subject matter of any one of examples 32-33, where the neural network model includes a convolutional neural network.

Example 35 includes the subject matter of any one of examples 33-34, where the subset of weights are determined based on the subset of weights having values falling outside a threshold.

Example 36 includes the subject matter of example 35, where the threshold for the particular layer is different from thresholds determined for one or more other layers in the plurality of layers.

Example 37 includes the subject matter of example 36, where the threshold is determined for the particular layer based on statistical metrics based on full-precision weights of the particular layer at the particular training iteration.

Example 38 includes the subject matter of example 35, where the threshold is determined to be different for another one of the plurality of training iterations.

Example 39 includes the subject matter of example 38, where the threshold is determined for the particular layer, and thresholds determined for the particular layer are different from thresholds determined for one or more other layers in the plurality of layers.

Example 40 includes the subject matter of any one of examples 32-39, where the neural network compression engine is further executable to: identify a delay parameter; and perform the training of the neural network model based on the delay parameter, where a first portion of the plurality of training iterations are performed without compression of layers of the neural network model based on the delay parameter, and compression of the layers of the neural network model is to begin following completion of the first portion of the plurality of training iterations, where the compression of the layers of the neural network model includes weight sparsification and quantization of weights.

Example 41 includes the subject matter of example 40, where the delay parameter includes a number of training iterations corresponding to the first portion of the plurality of training iterations.

Example 42 includes the subject matter of any one of examples 32-41, further including a resource-constrained system, where the compressed version of the neural network model is to be provided to the resource-constrained system to perform inferences using the compressed version of the neural network model.

Example 43 includes the subject matter of example 42, where performing the inferences includes quantization of activations determined based on an input provided to the compressed version of the neural network model.

Example 44 includes the subject matter of any one of examples 42-43, where the resource-constrained system includes one of a robot, a vehicle, or a drone.

Example 45 includes the subject matter of any one of examples 32-44, wherein the memory is store a copy of a full-precision version of the neural network model, the neural network compression engine is further executable to: determine one or more gradients associated with the particular layer based on a loss function; and update a full-precision version of the particular layer in the copy of the full-prevision version of the neural network model based on the gradients, wherein the updated full-precision version of the particular layer is to be used in a subsequent one of the plurality of training iterations.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A non-transitory machine-readable storage medium with instructions stored thereon, wherein the instructions are executable by a machine to cause the machine to:
   perform a forward pass in a training process for training a neural network model, wherein performing the forward pass comprises:
      pruning a first subset of weights of a layer in the neural network model, and
      quantizing a second subset of weights of the layer,
      wherein after the forward pass, the layer has one or more sparse-quantized weights and one or more full-precision weights;
   perform a backward pass in the training process, wherein performing the backward pass comprises:
      quantizing one or more gradient values during the backward pass, and
      updating a value of a full-precision weight of the layer during the backward pass; and
   generate a compressed version of the neural network model, wherein the compressed version of the neural network model comprising the layer with the one or more sparse-quantized weights and the full-precision weight having the updated value.

2. The storage medium of claim 1, wherein pruning the first subset of weights precedes quantizing the second subset of weights in the forward pass.

3. The storage medium of claim 1, wherein the instructions, when executed, further cause the machine to:
   convolve at least the one or more sparse-quantized weights, during the forward pass, with activations generated by another layer in the neural network model to generate activations of the layer; and
   quantize values of activations of the layer during the forward pass.

4. The storage medium of claim 1, wherein the first subset of weights are determined based on values of the first subset of weights falling outside a threshold.

5. The storage medium of claim 4, wherein the instructions, when executed, further cause the machine to determine, for the layer, the threshold, wherein the threshold for the layer is different from one or more thresholds determined for one or more other layers in the neural network model.

6. The storage medium of claim 5, wherein the threshold is determined for the layer based on statistical metrics based on full-precision weights of the layer.

7. The storage medium of claim 4, wherein the instructions, when executed, further cause the machine to determine the threshold, wherein the threshold is determined for a training iteration in the training process, and the threshold is determined to be different for another training iteration in the training process.

8. The storage medium of claim 7, wherein the threshold is determined for the layer, and thresholds determined for the layer are different from thresholds determined for one or more other layers in the neural network model.

9. The storage medium of claim 1, wherein the instructions, when executed, further cause the machine to:
   identify a delay parameter; and
   perform the training process of the neural network model, wherein a first portion of the training process is performed without compression of layers of the neural network model based on the delay parameter, and compression of the layers of the neural network model begins following completion of the first portion of the training process, wherein the compression of the layers of the neural network model comprises pruning the first subset of weights of the layer and quantizing the second subset of weights of the layer.

10. The storage medium of claim 9, wherein the delay parameter comprises a number of training iterations corresponding to the first portion of the training process.

11. The storage medium of claim 1, wherein the portion of the subset of weights is quantized using min-max quantization.

12. The storage medium of claim 1, wherein the neural network model comprises a convolutional neural network.

13. A method comprising:
   performing a forward pass in a training process for training a neural network model, wherein performing the forward pass comprises:
      pruning a first subset of weights of a layer in the neural network model, and
      quantizing a second subset of weights of the layer,
      wherein after the forward pass, the layer has one or more sparse-quantized weights and one or more full precision weights;
   performing a backward pass in the training process, wherein performing the backward pass comprises:
      quantizing one or more gradient values during the backward pass, and
      updating a value of a full-precision weight of the layer during the backward pass; and
   generating a compressed version of the neural network model, wherein the compressed version of the neural network model comprising the layer with the one or more sparse-quantized weights and the full-precision weight having the updated value.

14. The method of claim 13, wherein the layer in the compressed version of the neural network model comprises fewer weights than an original version of the layer in the neural network model, and the fewer weights are quantized to the lower precision in the compressed version of the neural network model.

15. The method of claim 13, further comprising:
   performing a loss function based on activation values determined for the layer;
   determining the one or more gradient values based on the loss function; and
   updating the value of the full-precision weight of the layer based on the one or more quantized gradient values.

16. A system comprising:
   a data processor; and
   a memory storing instructions executable by the data processor to perform a training process to train a neural network model, wherein performing the training process comprises:
      performing a forward pass in the training process, wherein performing the forward pass comprises:
         pruning a first subset of weights of a layer of the neural network model, and quantizing a second subset of weights of the layer, wherein after the forward pass, the layer has one or more sparse-quantized weights and one or more full-precision weights, performing a backward pass in the training process, wherein performing the backward pass comprises:

quantizing one or more gradient values during the backward pass, and updating a value of a full-precision weight of the layer during the backward pass, and generating a compressed version of the neural network model, wherein the compressed version of the neural network model comprising the layer with the one or more sparse-quantized weights and the full-precision weight having the updated value.

17. The system of claim 16, wherein performing the training process further comprises:

determination of activations for the layer in the forward pass; and quantizing one or more of the activations.

18. The system of claim 16, wherein the compressed version of the neural network model is to be provided to a resource-constrained system for inference using the compressed version of the neural network model.

19. The system of claim 18, wherein the inference comprises quantization of activations determined based on an input provided to the compressed version of the neural network model.

20. The system of claim 18, wherein the resource-constrained system comprises a robot, a vehicle, or a drone.

21. The storage medium of claim 1, wherein one or more values of the one or more sparse-quantized weights remain the same in the backward pass.

22. The method of claim 13, wherein one or more values of the one or more sparse-quantized weights remain the same in the backward pass.

23. The system of claim 16, wherein one or more values of the one or more sparse-quantized weights remain the same in the backward pass.

* * * * *